(12) United States Patent
Russell

(10) Patent No.: US 8,312,414 B2
(45) Date of Patent: *Nov. 13, 2012

(54) METHOD AND SYSTEM FOR EXECUTING A DATA INTEGRATION APPLICATION USING EXECUTABLE UNITS THAT OPERATE INDEPENDENTLY OF EACH OTHER

(75) Inventor: John Russell, Bedford, MA (US)

(73) Assignee: Expressor Software, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/420,972

(22) Filed: Mar. 15, 2012

(65) Prior Publication Data

US 2012/0173557 A1    Jul. 5, 2012

Related U.S. Application Data

(63) Continuation of application No. 12/177,708, filed on Jul. 22, 2008, now Pat. No. 8,141,029.

(60) Provisional application No. 61/052,548, filed on May 12, 2008.

(51) Int. Cl.
*G06F 9/44* (2006.01)

(52) U.S. Cl. ..................................... 717/100

(58) Field of Classification Search .................. 717/100
See application file for complete search history.

(56) References Cited

U.S. PATENT DOCUMENTS

| | | | |
|---|---|---|---|
| 5,712,971 A | 1/1998 | Stanfill et al. | |
| 5,819,021 A | 10/1998 | Stanfill et al. | |
| 5,857,204 A | 1/1999 | Lordi et al. | |
| 5,897,638 A | 4/1999 | Lasser et al. | |
| 6,014,670 A | 1/2000 | Zamanian et al. | |
| 6,044,374 A | 3/2000 | Nesamoney et al. | |
| 6,088,716 A | 7/2000 | Stanfill et al. | |
| 6,208,990 B1 | 3/2001 | Suresh et al. | |
| 6,266,804 B1 | 7/2001 | Isman | |
| 6,301,701 B1 | 10/2001 | Walker et al. | |
| 6,339,775 B1 | 1/2002 | Zamanian et al. | |
| 6,584,581 B1 | 6/2003 | Bay et al. | |
| 6,654,907 B2 | 11/2003 | Stanfill et al. | |
| 6,665,862 B2 | 12/2003 | Isman | |
| 7,047,232 B1 | 5/2006 | Serrano | |
| 7,164,422 B1 | 1/2007 | Wholey, III et al. | |
| 7,167,850 B2 | 1/2007 | Stanfill | |
| 2002/0007406 A1* | 1/2002 | Arunachalam | 709/219 |
| 2005/0155035 A1 | 7/2005 | Branigan et al. | |
| 2005/0232046 A1 | 10/2005 | Mamou et al. | |
| 2005/0262192 A1 | 11/2005 | Mamou et al. | |
| 2006/0179075 A1 | 8/2006 | Fay | |
| 2011/0047525 A1* | 2/2011 | Castellanos et al. | 717/104 |

OTHER PUBLICATIONS

International Search Report issued for PCT/US09/43267, dated Jul. 1, 2009 (2 pages).

* cited by examiner

*Primary Examiner* — Anna Deng
*Assistant Examiner* — Junchun Wu
(74) *Attorney, Agent, or Firm* — Wilmer Cutler Pickering Hale & Dorr LLP.

(57) ABSTRACT

Methods and systems for executing a data integration application using executable units that operate independently of each other. Methods include receiving a specification for a data integration application comprising programmatic rules and specifying data-flow, creating executable units corresponding to the programmatic rules, creating data-flow channels corresponding to the specified data-flow, and executing the executable units such that data is passed between them in a non-blocking manner.

1 Claim, 17 Drawing Sheets

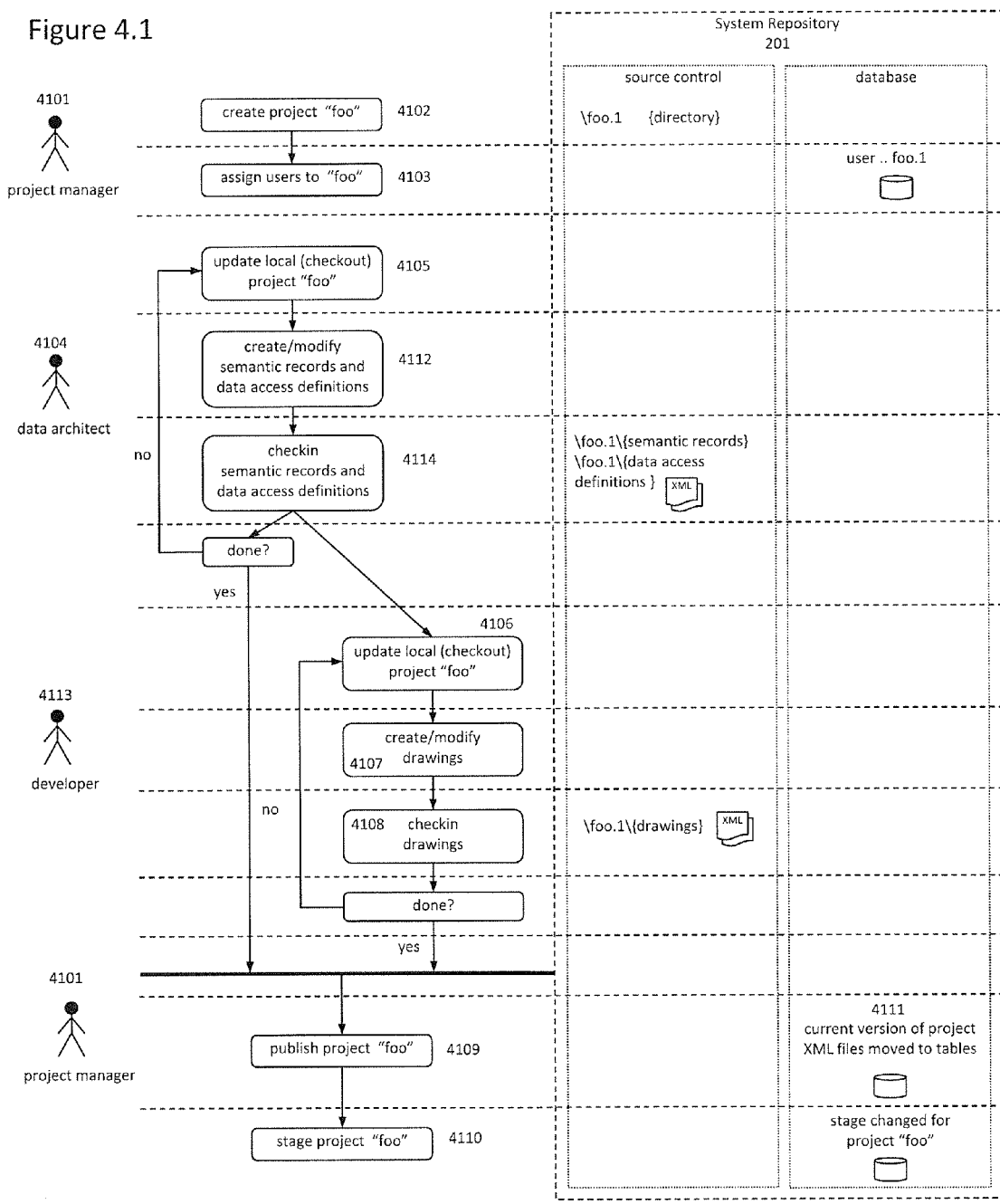
Figure 4.1

METHOD AND SYSTEM FOR EXECUTING A DATA INTEGRATION APPLICATION USING EXECUTABLE UNITS THAT OPERATE INDEPENDENTLY OF EACH OTHER

CROSS-REFERENCE TO RELATED APPLICATIONS

This application is a continuation of prior U.S. patent application Ser. No. 12/177,708 filed on Jul. 22, 2008, entitled METHOD AND SYSTEM FOR EXECUTING A DATA INTEGRATION APPLICATION USING EXECUTABLE UNITS THAT OPERATE INDEPENDENTLY OF EACH OTHER, which claims the benefit under 35 U.S.C. §119(e) of U.S. Provisional Patent Application No. 61/052,548, filed on May 12, 2008, entitled METHOD AND SYSTEM FOR STRUCTURING AND PERFORMING DATA INTEGRATION AND CONVERSION USING A SEMANTIC MODEL, both of which are herein incorporated by reference in their entirety.

This application is related to the following applications filed on Jul. 22, 2008:
- U.S. patent application Ser. No. 12/177,711, entitled Method and System for Debugging Data Integration Applications with Reusable Synthetic Data Values;
- U.S. patent application Ser. No. 12/177,659, entitled Method and System for Managing the Development of Data Integration Projects to Facilitate Project Development and Analysis Thereof;
- U.S. patent application Ser. No. 12/177,172, entitled Method and System for Developing Data Integration Applications with Reusable Semantic Identifiers to Represent Application Data Sources and Variables;
- U.S. patent application Ser. No. 12/177,665, entitled Method and System for Developing Data Integration Applications with Reusable Functional Rules that are Managed According to their Output Variables.

BACKGROUND

1. Field of the Invention

The present invention relates generally to data integration applications, and, more specifically, to executing data integration applications using executable units that use independent channels to send data and status messages.

2. Discussion of Related Art

When a database system is upgraded or replaced, the existing data must be transferred to the new system. This process, called data migration, is becoming increasingly expensive as database systems become larger and more complex. Planning and executing a data migration consumes valuable resources and can often result in considerable downtime. Also, mistakes in data migration can lead to data corruption, which is not an acceptable risk for institutions that handle sensitive data.

These difficulties are compounded when it is necessary to combine data from several different data storage systems, a process known as data integration. Data integration applications must reconcile data from several potentially incompatible storage systems, convert these data into a unified format, and load the new data into the target database. These are complicated tasks, and they require careful planning and detailed knowledge of the structure of the source databases. Errors in data integration are common, difficult to diagnose, and expensive to fix.

In the past, data integration applications have typically been developed for a specific database upgrade or merger task, and they become useless after this task is complete. This ad hoc approach makes it impossible to reuse program code, substantially increasing the cost of development. Also, it tends to produce applications that are written from scratch and not comprehensively tested, increasing the likelihood of data corruption.

In light of these problems, there exists a need for an improved method of developing database applications that minimizes the costs and risks associated with data migration and data integration.

SUMMARY OF THE INVENTION

The present invention provides methods and systems for executing a data integration application using executable units that operate independently of each other.

Under one aspect of the invention, a method is presented that comprises receiving a specification for a data integration application comprising programmatic rules and specifying data-flow between them, creating executable units operable to execute each of the programmatic rules, creating data-flow channels mirroring the specified data-flow, and launching the executable units such that they operate independently of each other to process data and convey data through the data-flow channels, and such that each of the executable units provides status information on a non-blocking, out-of-band information channel that is independent of the data-flow channels.

Under another aspect of the invention, the method further includes reserving an exclusive portion of a shared memory structure for each of the executable units, wherein each of the executable units writes status information in a non-blocking manner to the exclusive portion of the shared memory structure reserved for said executable unit.

Under another aspect of the invention, the method further includes launching a control unit that periodically reads, according to a configurable parameter that specifies a fixed schedule, the status information written by each of the executable units to the shared memory structure.

Under another aspect of the invention, the method includes launching all of the executable units on a single host.

Under another aspect of the invention, the method further includes automatically validating the received data integration application specification and providing controls during the development process that present only valid options to a developer.

BRIEF DESCRIPTION OF THE SEVERAL VIEWS OF THE DRAWINGS

FIG. 4.1 is a flowchart that depicts the various stages of project development, according to certain embodiments of the invention.

DETAILED DESCRIPTION

I. Introduction

Figure 1:
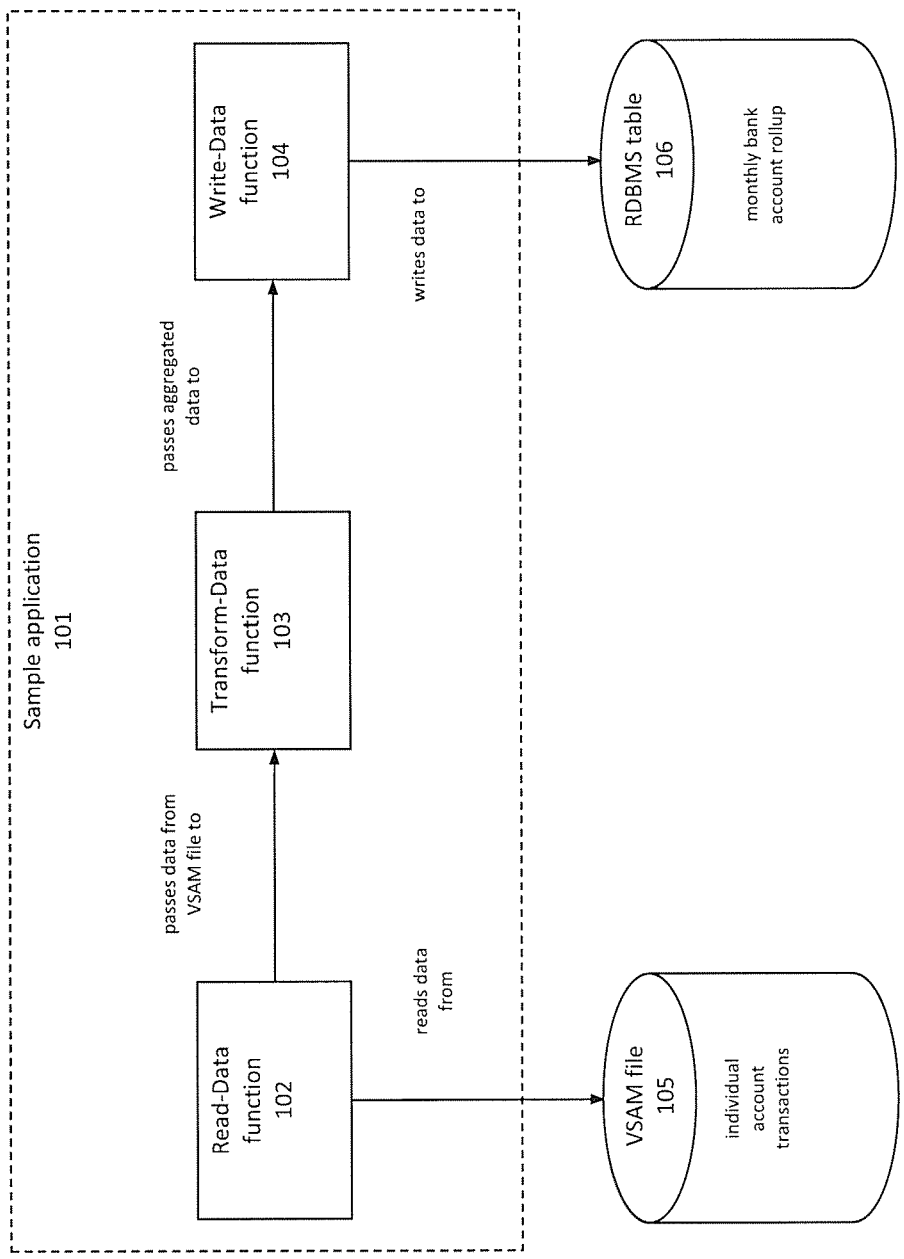
FIG. 1 is a dataflow diagram that illustrates the operation of an example application, according to certain embodiments of the invention.

Preferred embodiments of the present invention provide semantic systems and methods for developing, deploying, running, maintaining, and analyzing data integration applications and environments.

Those data integration applications that are relevant to the techniques described herein are broadly described by the class of applications concerned with the movement and transformation of data between systems and commonly represented by, but not limited to: data warehousing or ETL (extract-transform-load) applications, data profiling and data quality applications, and data migration applications that are concerned with moving data from old to new systems.

Data integration applications developed and maintained using these techniques are developed using a semantic model. At its core, a semantic development model enables an application to be partially or fully developed without knowledge of the physical data identities (locations, structures, names, types, etc.) being integrated. Physical identities are present in the system but they are abstracted with semantic identities. There are several advantages to this approach: changes to physical data locations or structures do not automatically prevent the application developer from accomplishing real work; a high or intimate level of knowledge of the data being integrated is not required; business rules and other application logic developed using semantic identities can easily be reused and tested from application to application regardless of the physicality of the underlying data structures; and the costs of data mapping exercises can be significantly reduced over time as the system learns about fields that are semantically equivalent.

A data integration application developed using the techniques described herein is preferably stored in a common repository or database. This database includes a semantic metadata model that correlates physical locations and datatypes, representing the source and target data, with semantic identities. The database also includes representations of business rules that are defined using semantic identities instead of physical identities. The business rules and the semantic model are stored and maintained separately. Thus, application developers do not need to know the physical locations or datatypes of the source data in order to implement data transformation functions.

The repository is preferably maintained and updated using a hybrid versioning system for data integration projects. This system provides version control for project artifacts, and also provides a fine-grained locking mechanism that controls the ability to edit and execute a project in various ways according to the project's current stage in the development process. The hybrid versioning system also interfaces with a relational database, which can be used to efficiently calculate and report project metrics.

The system's data integration engine executes data integration applications using a parallel, distributed architecture. Parallelism is achieved where possible by leveraging multiple redundant data sources and distributing the execution of the application across multiple hosts. The techniques disclosed herein are scalable to execution environments that comprise a large number of hosts.

Figure 16:
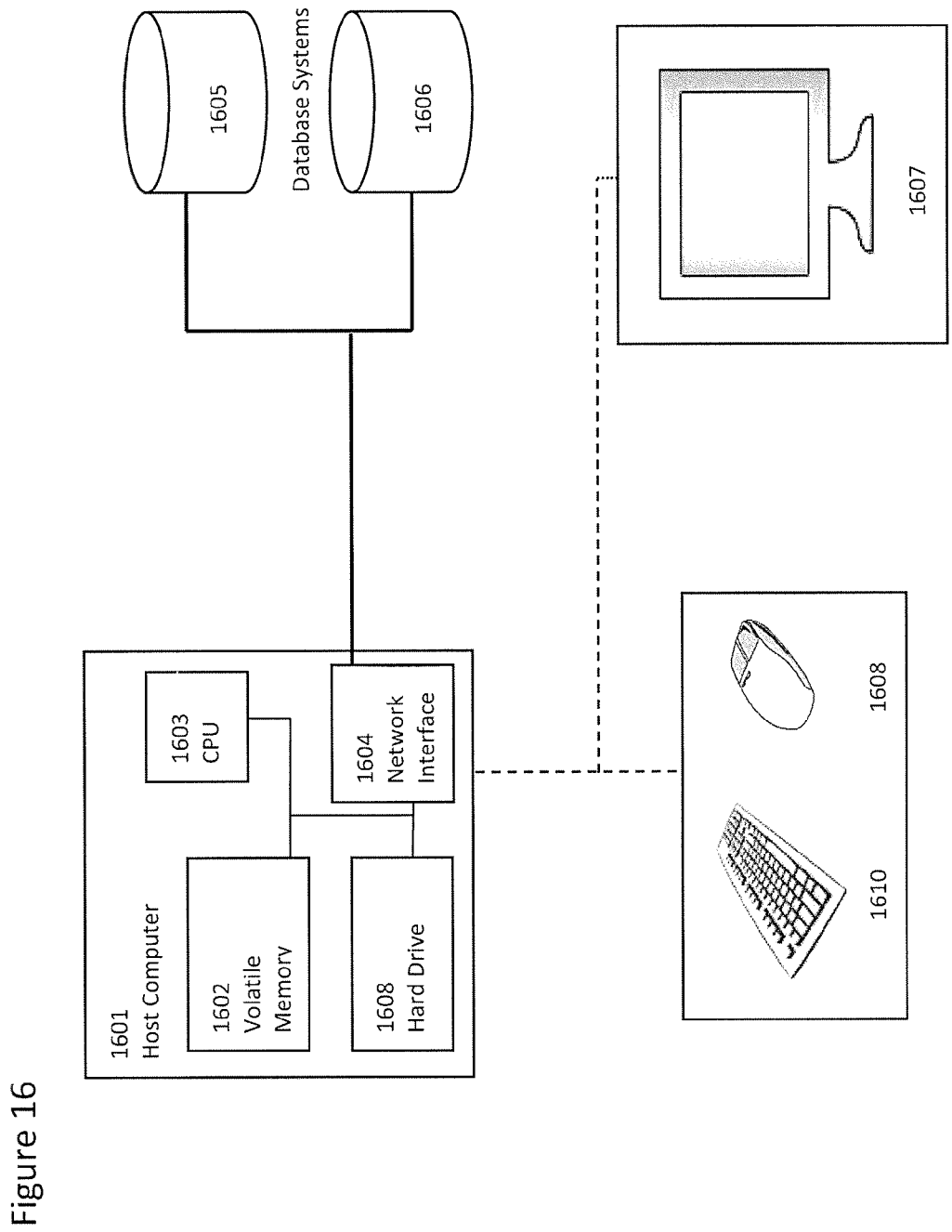
FIG. 16 is a diagram that depicts the various components of a data integration engine, according to certain embodiments of the invention.

FIG. 16 is a diagram that depicts the various components of a data integration system, according to certain embodiments of the invention. The functional logic of the data integration is performed by a host computer [1601], that contains volatile memory [1602], a persistent storage device such as a hard drive [1608], a processor [1603], and a network interface [1604]. Using the network interface, the computer can interact with databases [1605, 1606]. During the execution of the data integration application, the computer extracts data from some of these databases, transforms it according to programmatic data transformation rules, and loads the transformed data into other databases. Though FIG. 16 illustrates a system in which the computer is separate from the various databases, some or all of the databases may be housed within the host computer, eliminating the need for a network interface. The data transformation rules may be executed on a single host, as shown in FIG. 16, or they may be distributed across multiple hosts.

The host computer shown in FIG. 16 may also serve as a development workstation. Development workstations are preferably connected to a graphical display device [1607], and to input devices such as a mouse [1609], and a keyboard [1610]. One preferred embodiment of the present invention includes a graphical development environment that displays a data integration application as a diagram, in which the data transformation rules are represented by shapes and the flow of data between rules is represented by arrows. This visual interface allows developers to create and manipulate data integration applications at a more intuitive level than, for example, a text-based interface. However, the techniques described herein may also be applied to non-graphical development environments.

Each of these features is discussed in more detail in the sections that follow.

II. Project Model

FIG. 1 is a dataflow diagram that illustrates the operation of an example data integration application that will be referenced in following sections. An application organizes the execution of a set of functions, which perform individual units of work, and the flow of data between those functions. The sample application [101] has three functions, represented by boxes, and data flow between those functions, represented by arrows.

In this example, the Read-Data function [102] reads monthly transactional bank account data from a VSAM file [105] and outputs that data for use as input in the next function. The Transform-Data function [103] receives its input from the Read-Data function. Its transformation logic aggregates those bank account transactions to compute end-of-month status for each account, and outputs the end-of-month status for use as input to the next function. Finally, the Write-Data function [104] receives the end-of-month status from the Transform-Data function and writes that data to a flat RDBMS table [106] which will be used to produce monthly snapshot reports for each bank account.

Development of the sample application [101] begins when a project is created for managing the application's development and deployment. Also, a semantic model, separate from the project, is used to store and maintain the association between physical identities (i.e. the physical locations and datatypes of the project's source data) and semantic identities. If no semantic models have been created for the relevant data, a new semantic model is initialized. If a semantic model for the project's source data had already been created (e.g. by a prior project, or through ongoing maintenance) then the new project may use the existing semantic model; thus, it is not necessary to create a new semantic model for each new project.

After the creation of the project, project-specific artifacts may be created. These artifacts, discussed in more detail below, are tested and checked-in to the repository. The project entity also contains an identifier that represents the current stage of project development. At each stage of the project the application is executed by the data integration engine in a stage-specific environment. Eventually the application is considered complete and the project, and all applications contained within the project, are moved into production.

Figure 2:
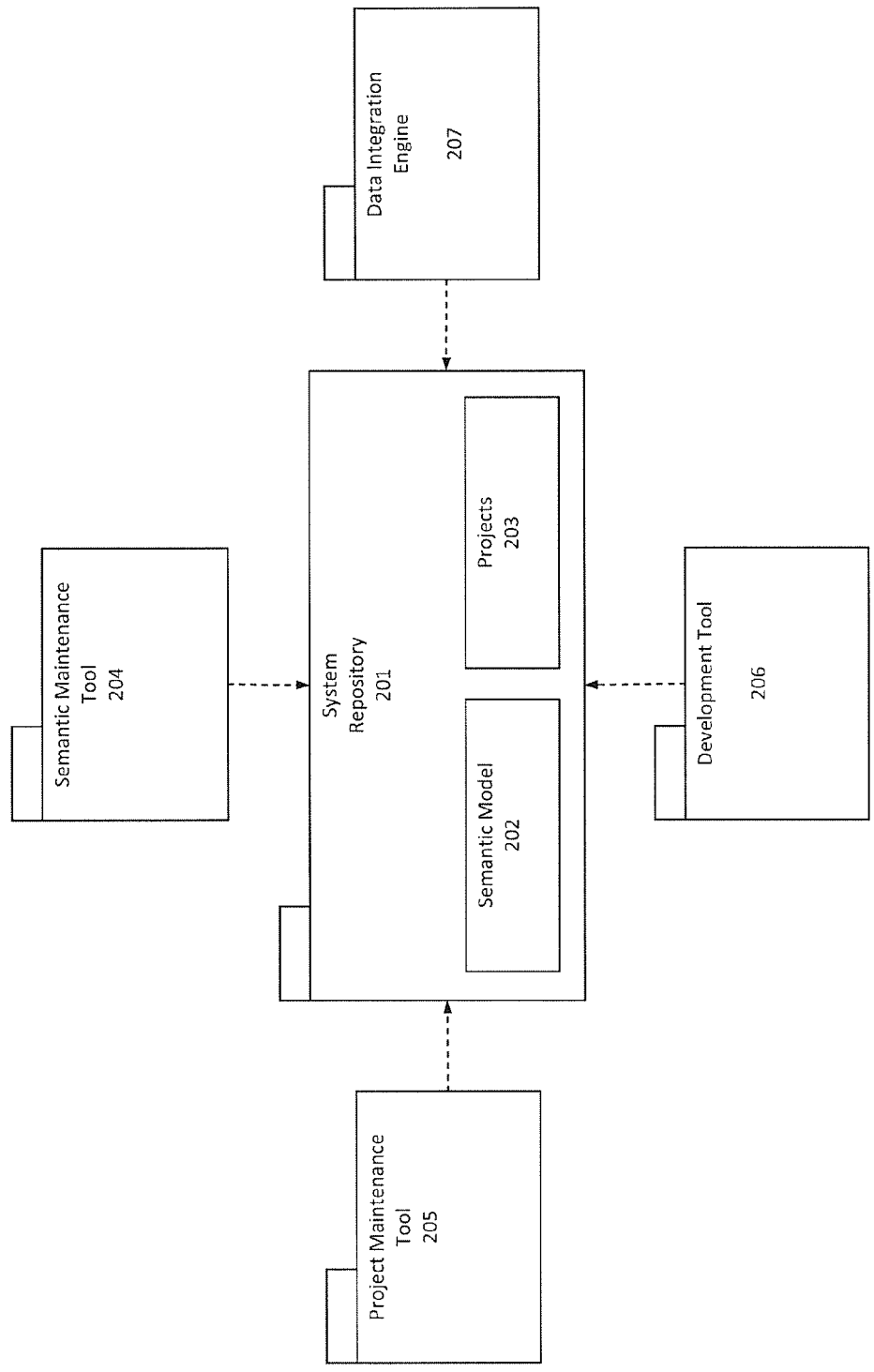
FIG. 2 is a UML package diagram that depicts the coarse dependencies and relationships among the basic components of the semantic data integration system, according to certain embodiments of the invention.

FIG. 2 is a UML package diagram that depicts the coarse dependencies and relationships among the basic components of the semantic data integration system, according to certain embodiments of the invention.

The system repository [201] is a database used by the system's tools and engine. It is centrally deployed in order to capture and share system objects across applications, and to provide visibility into data integration projects, data usage, application performance, and various metrics. The repository consists of three high-level subsystems: a relational database, a source control system, and business logic to implement functionality such as creating a project, publishing, staging, etc. The database and source control subsystems are provided using conventional third party technologies. The business logic is implemented with a J2EE application but could easily be .NET or some other web-application technology. The various system tools (semantic maintenance tool [204], project maintenance tool [205], and development tool [206]) connect to these repository subsystems directly as required.

The primary contents of the repository include: the semantic model [202] which captures metadata that describes the contextual or semantic identities in an enterprise, the actual or physical identities in an enterprise, and various relationships between the semantic identities and physical identities, and projects [203] which are system objects that group related artifacts necessary for defining and deploying a data integration application The repository is manipulated by system tools including: the semantic maintenance tool [204], which maintains the semantic model, the project maintenance tool [205], which maintains projects and associated data and generates reports to various levels of detail across the system, the development tool [206] which is used to develop data integration applications, and the integration engine [207], which executes applications using a parallel, distributed system, computes runtime statistics, and stores these statistics in the repository. Additional description of these components and how they interact is included below.

Figure 3:
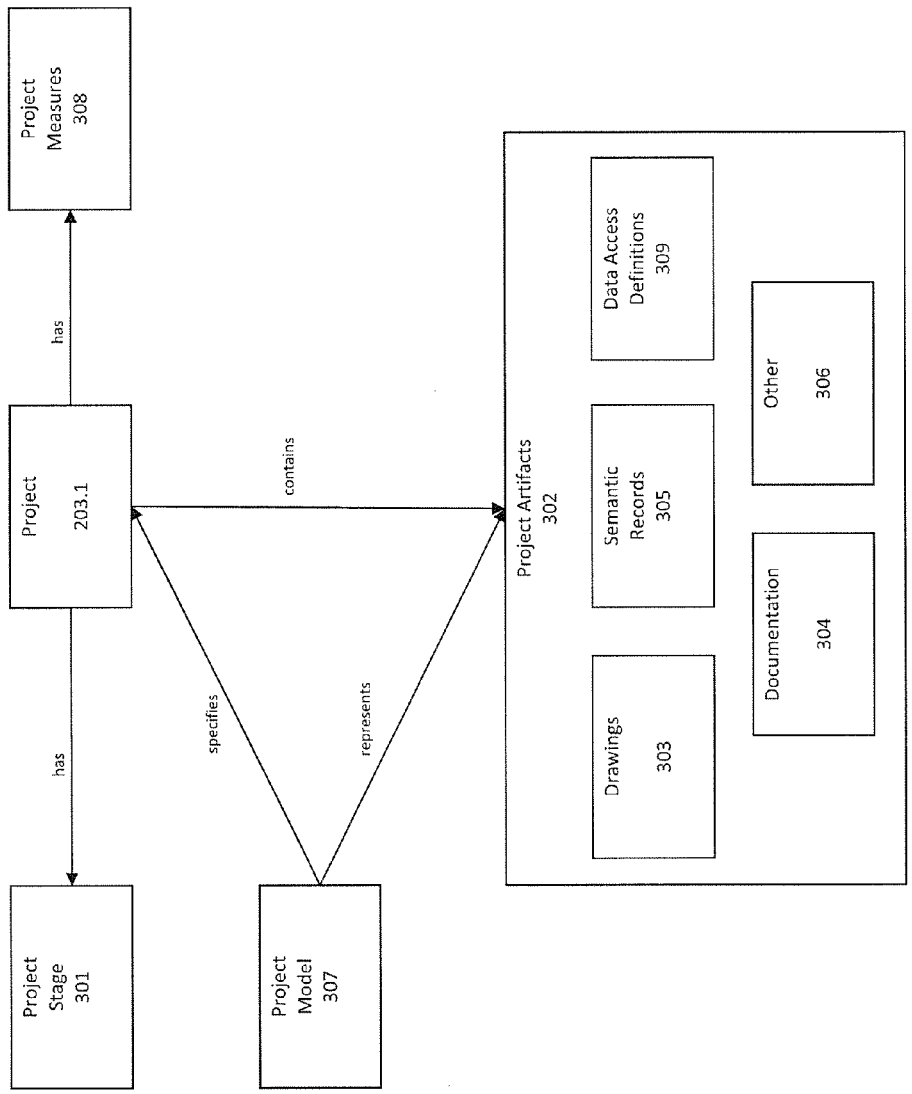
FIG. 3 is a relationship diagram that illustrates the relationships among the various types of project objects stored in the repository, according to certain embodiments of the invention.

FIG. 3 is a relationship diagram that illustrates the relationships among the various types of project objects stored in the repository, according to certain embodiments of the invention. A relationship diagram is a modified UML class diagram that conveys the relationships between objects or components. The object or component is labeled in a rectangular box and a relationship to another object or component is represented with a labeled arrow from one box to the other. The relationship reads from arrow begin to arrow end (the end of the line with the actual arrow). Like UML class diagrams, these relationship diagrams allow for containment to be expressed with an arrow or by placing the child object visually within the parent object. In some cases the rectangle for an object or component is dashed indicating that it is not an actual object but it is really a conceptual group (like an abstract class) for the objects shown therein.

A project [203.1] as depicted is one of the many projects [203] shown in FIG. 2. A project is a system object that is used to organize and manage the development and deployment of data integration applications through various stages. A project's stage [301] specifies the current state of the project within the development and deployment process. The various stages that may be associated with a project are described in more detail below. A project's measures [308] are metrics or statistics relevant to the project that are collected after the project is created.

A project's artifacts [302] define the project's applications and supporting metadata. These are preferably captured as XML files that are versioned using the standard source control functionality implemented by the development tool. Project artifacts are accumulated after inception and include: drawings [303] which are visual descriptions of the functions, transformations, and data flow for one or more applications; data access definitions [309] which individually describe a set of parallel access paths (expressed as URIs) to physical data resources; semantic records [304] which primarily describe the data structures for one or more applications; documentation [305] for the project and its artifacts, and other artifacts [306] that may be created during the life of the project.

The project model [307] is a relational model that represents the project, its artifacts, and other data and metadata for the project. The project model and project measures provide a basis for introspection and analysis across all projects in the system.

A project's stage also controls where the project can be run. In an environment where this system is deployed, individual machines where the engine can run are designated to allow execution only for a specific stage. For example, host machine SYSTEST288 may be designated as a system testing machine. Any instance of the system's engine that is deployed on SYSTEST288 will only allow projects in the "system testing" stage [301.2] to run. This additional level of control is compatible with how IT departments prefer to isolate business processes by hardware.

For example, the simple application described above [101] might be developed as part of a new project implemented by the IT department of a financial institution that wishes to gather and analyze additional monthly status for individual bank accounts. The project [203.1] would be created by a project manager using the project maintenance tool [205] and the project would begin in the development stage [301.1] (described below). Preliminary project artifacts [302] such as semantic records [304] (described below) would then be defined and added to the project by a data architect or equivalent. A developer would then use these artifacts to create drawings [303] which define the transformation logic of the application [101]. As the application is developed and tested, the project would move through various stages (see FIG. 4) until it is finally placed into production. The project measures [308] would allow the project manager and others to analyze the project using relational reporting and analysis techniques in order to improve the company's data integration and business processes.

The development tool [206] is conventional, and similar in layout and purpose to many other existing graphical programming tools that may be used for defining workflow, process flow, or data integrations. Examples of such tools include Microsoft BizTalk Orchestrator, Vignette Business Integration Studio, and FileNet Process Designer, among others. The primary workspace consists of a palette of symbols corresponding to various functions that may be performed by the engine [207], and a canvas area for creating a drawing. Prior to creating drawings for a project, the user is given permission to work on that project by another user, typically a project manager, of the project maintenance tool [205]. These permissions are stored in the repository [201].

From within the development tool, which is installed on the local computer of the developer using the tool, the developer is allowed to "check out" a snapshot of the artifacts for any project for which the user has permission (as defined in the repository). The project artifacts must include any semantic records [305] and data access configurations [309] that the developer will need to build the drawing; these requisite artifacts were previously defined by another user, typically a data architect, using the project maintenance tool [205].

Within the development tool, the user creates a drawing. Using our sample application for descriptive purposes, this process may work like this:

After project checkout (defined above), the user drags functions from the palette to the canvas area. In the case of our sample application, the user would drag 3 different functions from the palette: one to read data from a file (necessary for the Read-Data function [101]), one to transform data (necessary for the Transform-Data function [102]), and one to write data to a table (necessary for the Write-Data function [103]). The user would then visually "connect" the functions in the drawing according to the direction of the data flow for the sample application. Each function has properties that must be configured to define its specific behavior for the engine.

The user will then edit these properties with standard property editor user interfaces. The properties specified by the user for the Read-Data function include the name of its output semantic record [305.2] which specifies the data being read from the file, and the name of a data access configuration [309] which specifies one or more parallel access paths (expressed as URIs) to the file. The properties specified by the user for the Write-Data function include the name of its input semantic record [305.1] which specifies the data being written to the table, and the name of a data access definition [309] which specifies one or more parallel access paths (expressed as URIs) to the table.

Because the user connected the Read-Data function to the Transform-Data function, the input semantic record [305.1] for the Transform-Data function [103] is automatically derived from the output semantic record of the Read-Data function [102] and because the user connected the Write-Data function to the Transform-Data function, the output semantic record [305.2] for the Transform-Data function [103] is automatically derived from the input semantic record of the Write-Data function [104]. The user will further configure the Transform-Data function in the drawing by specifying its transformation logic in a transformation editor. The semantic identities of the input semantic record and output semantic record are presented to the user in this editor. In the transformation editor, the user provides logic that specifies how output values in the semantic record are calculated. When the values are a direct move from input to output, a simple statement such as "output=input" can be used to automatically move data from input to output for any like-named semantic identities. When more specific rules are needed for an output field, they can be specified directly in the logic, for example:

output_full name=string.concatenate(input.first_name, "", input.last_name)

As the user builds the drawing and configures each function, the development tool will validate the drawing according to the rules of the engine and present warnings and errors to the user so that the user may correct the drawing. The user has the ability to synthetically debug (FIG. 9) the Transform-Data function from within the development tool. The user may also execute the drawing from the development tool; in this scenario the execution may be performed by a local instance of the engine which is installed with the development tool, or on a remote instance of the engine which has been installed in an environment configured to support such testing. In either case, the machine hosting the engine requires that any client access technologies relied on by the data access configurations [309] for each function in the drawing already be configured on the same machine; for example, in order to write to a table, the correct database drivers must be configured on the machine whose engine will be using those drivers to perform that operation. At any time during this development process, the developer may "check-in" the drawing to the repository. This process is conventional in terms of workflow and implementation; the user may provide a comment for the change and a new version of the new drawing will be added to the source control system in the repository.

III. Hybrid Version Control System

The project artifacts, which are maintained via traditional source control mechanisms as described, the project staging controls (described below), and the project model which models those sources in a relational database, are maintained using a hybrid version control system, comprising both a standard version control system and a relational database. Traditionally, version control systems have made it possible to record individual changes made to versioned artifacts, but do not allow for the analysis of these changes using standard relational database query techniques. Using pure relational database systems, however, it is extremely difficult to provide traditional version control functionality. Additionally, a traditional source control system does not inherently control access to system sources based on the development life-cycle stage of the project; such systems must rely on externally defined and enforced business practices to control access. The hybrid version control system disclosed herein allows for both traditional artifact versioning/source control and relational data modeling of the same artifacts. The hybrid version control system also provides built-in support for controlling access to project sources according to the current stage of the project.

Figure 4:
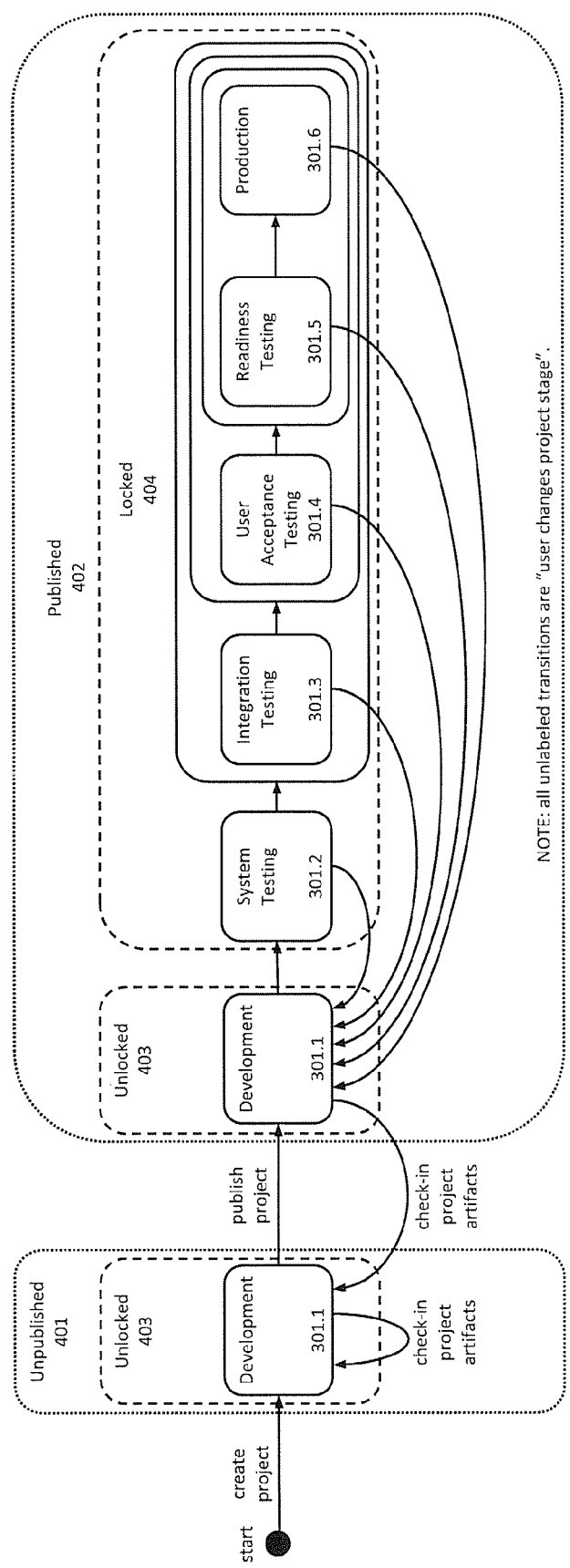
FIG. 4 is a UML state diagram that depicts the relationships among the various project stages, according to certain embodiments of the invention.

FIG. 4 is a UML state diagram that depicts the relationships among the various project stages [301], according to a preferred embodiment. The staging model provides control for moving a project through a development life-cycle.

At any given time, a project may be in at most one of the following deployment stages (analogous to states in a state transition diagram): development [301.1], system testing [301.2], integration testing [301.3], user acceptance testing [301.4], readiness testing [301.5], or production [301.6].

Each one of these stages has two superstates. The first superstate signifies whether a project is unlocked [403], which means that changes to project artifacts are allowed, or locked [404] which means that changes are not allowed. The second superstate signifies whether a project is unpublished [401], which means that the project model has not been refreshed from the most recent changes to project artifacts, or published [402] which means that the project model is fully representative of the current project artifacts.

In the preferred embodiment, a project is created, published, and staged using the project maintenance tool [205]. Individual artifacts and changes to them are stored as separate versions in the repository's source-control system using the system's tools such as the project maintenance tool [205] and the development tool [206]. User permissions related to project development may be implemented using any user authentication/control databases, such as LDAP and Active-Directory.

After a project is created, it is unpublished [401] and in the development stage [301.1]. Artifacts may only be added, modified, or removed from source control when the project is in the development stage which also implies that the project is unlocked [403]. When a project is "published," all of the information stored about the project in the version control system, including, e.g., new versions of drawings and functions, checkin/checkout log entries and times, etc., is moved into a relational database, the contents of which can be queried using traditional relational techniques. After a project is published it will be in a published state such that the repository's relational model of the project has been updated from all current project artifacts in source-control, making the project available for post-development deployment staging.

The project artifacts are moved from the source control system to the relational database using conventional serialization methods and systems. When it is published to the database, it does not replace the older published version of the project, but is stored as a separate publication. Thus, queries executed against the database may gather information and statistics about multiple publications.

If changes are again made to project artifacts while in the development stage, the project will again be in an unpublished state until being explicitly published again. From a published superstate a project in the development stage may be staged forward to any post-development stage including production [301.6]. After being staged out of development, the project is in a locked superstate such that artifacts cannot be modified until the project is staged back to development.

As an example, after development [301.1] is complete, the project for the sample application [101] may be published and moved to a system testing stage [301.2]. While in this stage, various system tests are performed on the application and changes to the project's artifacts are prohibited. If system testing is successful, the project may be moved to an integration testing stage [301.3]. While in this stage, one of the tests uncovers an issue that must be addressed by a slight change to the configuration of the Write-Data [104] function in the drawing for the application. The project is moved back to the development stage [301.1] so that a developer can make this change. After the change is tested by the developer and checked-in, the project is published again and moved back to the integration testing stage [301.3] for re-test. The application might then pass testing at this stage and each subsequent stage until it is finally put into production [301.6].

Each time the artifacts are published, the project model [307] and project measures [308] are updated. Both the project model and measures are maintained as a relational model in the repository. This enables project managers, data architects, decision makers, and other system users to query and analyze the project and projects in interesting ways. For example, a project manager may quickly learn in which projects a developer user has used a particular semantic record (which may be known to be broken); or cumulative usage across projects of a certain table; or which output rules for a certain semantic identity are used most. This type of inquiry and analysis is possible because of the publish functionality in the repository.

Some project metrics may use information from the source control system as well as the repository. Because a source file may be checked-out and checked-in multiple times between publications, only the source control system contains information about these intermediate file-versions.

FIG. 4.1 is a flowchart that depicts the separation of roles across the various stages of project development, according to certain embodiments of the invention. The project manager [4101] creates a project called "foo" [4102] in the source control system, and assigns users [4103] to it. The data architect [4104] then checks out the project [4105] and creates or modifies the semantic records and data access definitions that will be used by the project "foo" [4112] (these are discussed in more detail below). When this step is complete, the developer [4113] checks out the project [4106] and creates and modifies the project's drawings [4107] in the source repository, which specify the data transformation, extraction, and load rules used by the project and determine how data flows among these rules. When complete, the developer checks the project in [4108]. At this point, the project manager [4101] publishes the project [4109], which moves the project artifacts into the relational database [4110]. After the project has been published, it may be moved into the "staging" phase [4111]. Eventually, the project state will be set to "production," the final phase of the project development process.

IV. Semantic Model

Figure 5:
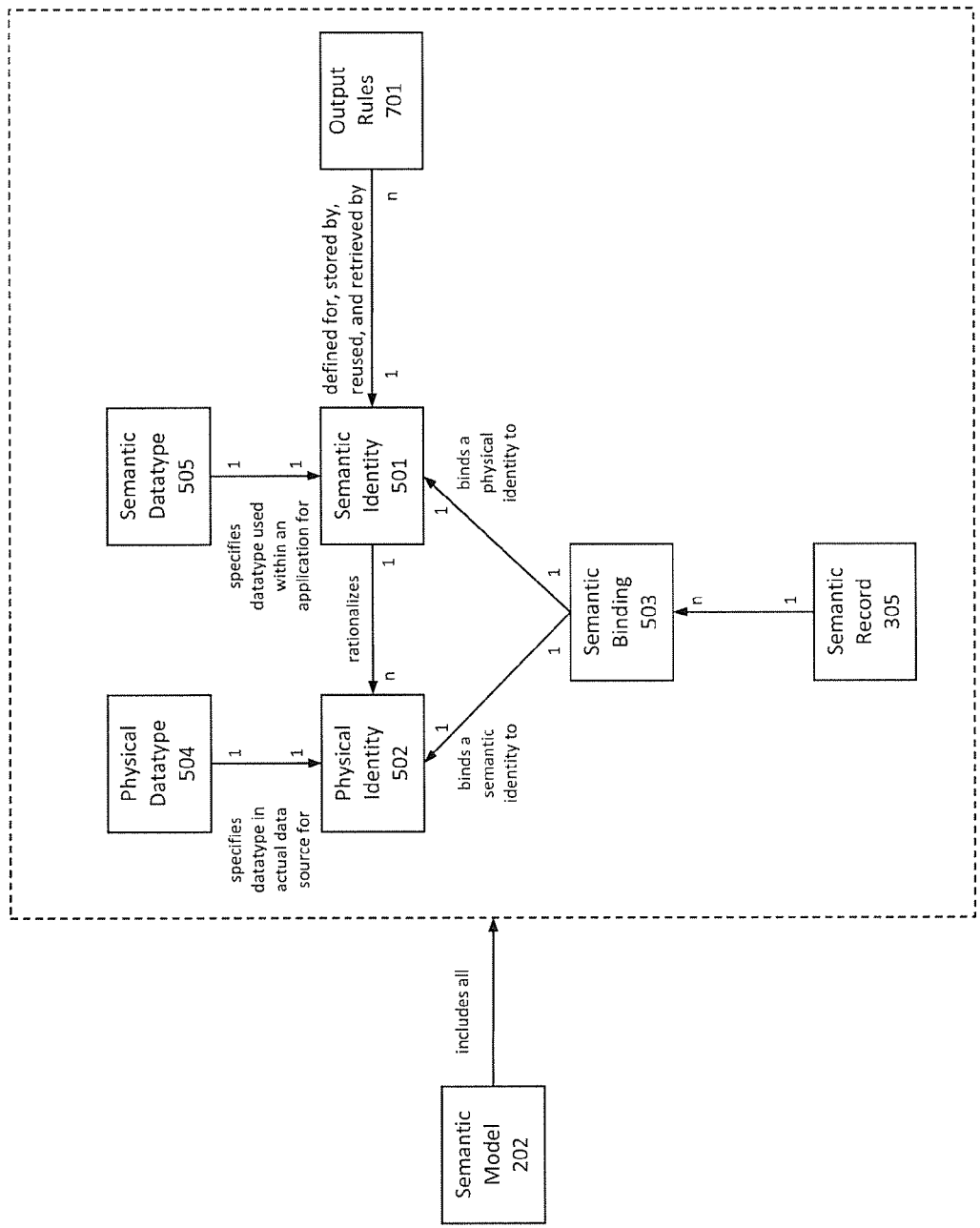
FIG. 5 is a relationship diagram that depicts the components of the semantic model, according to certain embodiments of the invention.

FIG. 5 is a relationship diagram (as described above) that depicts the components of the semantic model [202] in the repository [201], according to a preferred embodiment. The semantic identity [501] is metadata that represents the abstract concept or meaning for a single business object that may be used in an enterprise; for example, an employee's last name. Additional properties of the semantic identity pertaining to its semantic type, subject area, and composition are also captured in the semantic model.

The output rule [701] defines the business logic for calculating a value for the semantic identity within a data integration application. A semantic identity may have multiple output rules. The output rule and its usage is described in more detail in a later section.

The physical identity [502] is metadata that captures the external (physical) name of a specific business object (e.g., a database column). The physical datatype [504] captures the external (physical) datatype of the associated physical identity (e.g., "20 character ASCII string"). The semantic datatype [505] is associated with the semantic identity and specifies the datatype of the data referenced by the semantic identity, as used internally by the data integration application. The physical datatype is used by the engine when it is reading or writing actual physical data. The semantic datatype is used by the engine when processing transformation logic in the application (described later).

The semantic binding [503] associates a physical identity with a particular semantic identity. Many physical identities and their physical attributes may be associated with the same semantic identity. For example, fields from various physical data locations such as lastName with a physical datatype of CHAR(30) in one RDBMS table, last_name with a physical datatype of VARCHAR(32) in another RDBMS table, and LST_NM with a physical datatype of PICX (20) in a COBOL copybook, may all be physical instantiations of the semantic identity last_name, which could be universally associated with a semantic datatype string.

A semantic record [304] describes the layout of a physical data structure such as an employee table. Each field in the table would be described with a semantic binding that captures the actual column name (the physical identity) and the semantic identity. Other metadata specific to each field in the employee table, such as data type information, would also be described for each field in the semantic record.

Using the semantic maintenance and project maintenance tools, a user would create and maintain the semantic model as follows. The user would first locate the actual metadata for the physical data that must be represented. As an example, using the sample application, this would be the metadata for the VSAM file being read and the metadata for the RDBMS table being written. The names and types of each field or column would be preserved as physical identities and physical datatypes. A rationalization process, using conventional string matching techniques and statistical methods, is then performed by the tool that takes each physical identity, decomposes it, analyzes it, and suggests zero or more semantic identities. The user makes the final decision as to which semantic identity most applies to each physical identity. When an existing semantic identity does not apply, the user may define a new one and its semantic datatype. The physical identity, semantic identity, semantic binding, and other metadata gathered during the rationalization process, are saved in the repository.

The components of the semantic model are described in more detail below.

Figure 6:
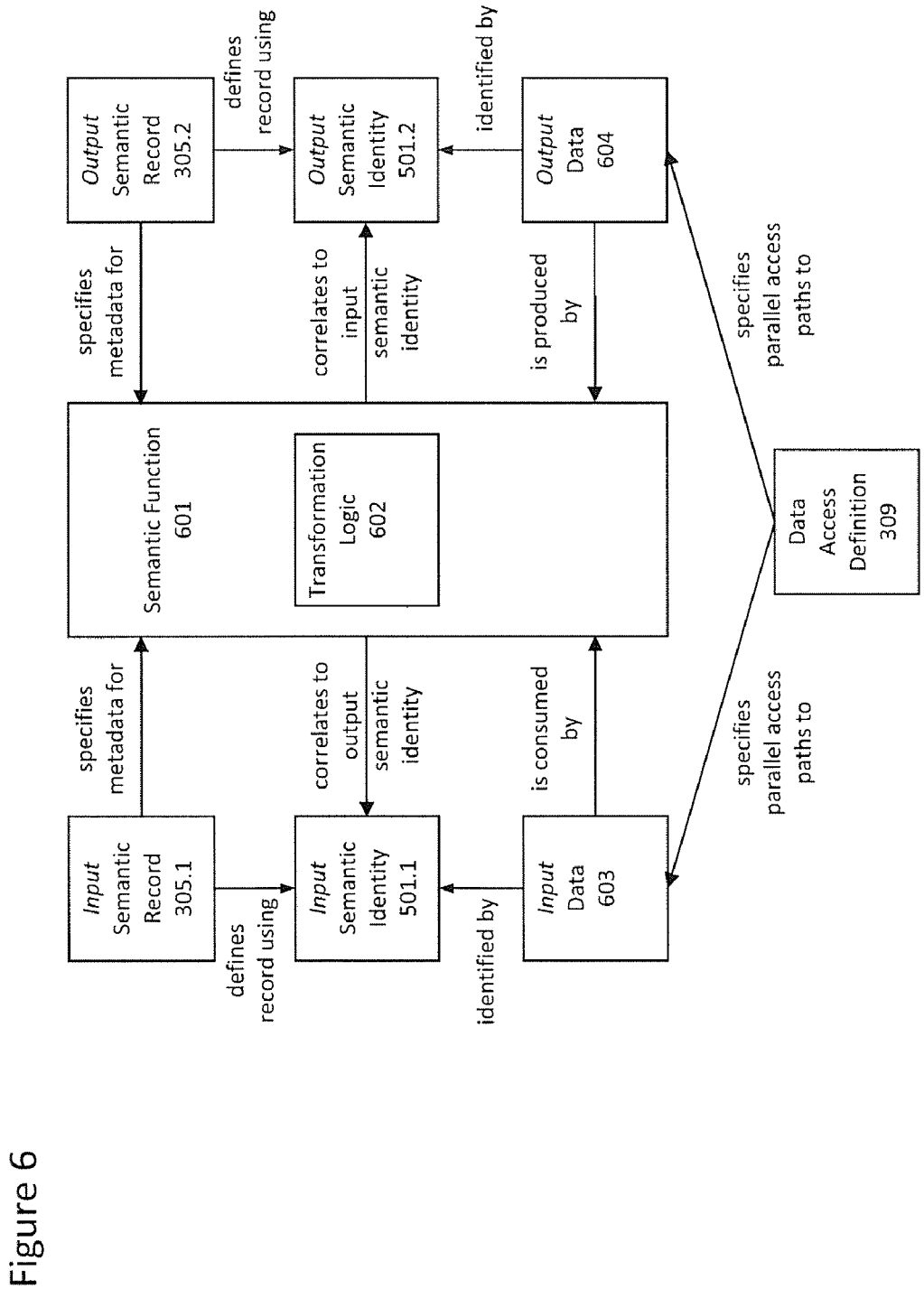
FIG. 6 is a relationship diagram that depicts the structure of a semantic data integration function within an application, according to certain embodiments of the invention.

FIG. 6 is a relationship diagram (as described above) that depicts the structure of a semantic data integration function within an application (such as the sample application described above) according to a preferred embodiment. A function [601] performs an individual body of work within an application. The function in FIG. 6 is a generic representation of any particular function in the present data integration system and could represent any of the functions [102], [103], or [104] in the sample application [101].

Depending on the type of function, the function may have the following types of input: input data [603], which is an actual input data value that the function will consume when it runs in the engine, an input semantic identity [501.1] is a semantic identity [501] from the semantic model (FIG. 5) that identifies an individual piece of data in a record that will be input to the function, and an input semantic record [305.1] is a semantic record [305] from the semantic model (FIG. 5) that describes the exact structure and format of a data record that will be input to the function.

Depending on the type of function, the function may have the following types of output: output data [604], which is an actual output data value that the function will produce when it runs in the engine, an output semantic identity [501.2] is a semantic identity [501] from the semantic model (FIG. 5) that identifies an individual piece of data in a record that will be output from the function, and an output semantic record [305.2] is a semantic record [305] from the semantic model (FIG. 5) that describes the exact structure and format of a data record that will be output from the function.

A data access definition [309] will also be associated with the function. When the purpose of the function is to read or write data from or to a physical data source, the data access definition will specify one or more URIs for accessing the physical data being read or written, each of which constitutes a parallel processing path (or channel) for the operation. When the function is an internal operation whose job is to manipulate data that has already been read (prior to writing), the data access definition identifies the particular channels that are relevant to the functions it is connected to.

Depending on the type of function, the function may also have transformation logic [609] which may be used to calculate the output values for the function.

A semantic function is able to correlate input data to output data using the semantic identities. For example, if the input semantic record [305.1] includes a field with semantic identity last_name [501.1] whose actual source is from a column named lastName [502] and if the output semantic record [305.2] includes a field with semantic identity last_name [501.1] whose actual data source is a field named lstNm in a file [502], provided that the semantic model captures these relationships, the function will know that the two fields are semantically equivalent because they share the same semantic identity last_name, and thus can move the correct input data [603] to the correct output data [604] with little or no additional specification.

Using our sample application as an example, the output semantic record [305.2] for the Read-Data function [102] may include a semantic binding [503] that binds the output semantic identity [501.2] last_name to a physical field named LST_NM in the data being read from the VSAM file [105]. The input semantic record [305.1] for the Transform-Data function [103] may include the same semantic binding. The data coming from the VSAM file on the mainframe stores all last names in upper case; ex: SMITH. The transformation logic [602] in the Transform-Data function [103], which is a semantic function [601] like all functions in an application for the present invention, may be written to convert the input data [603] for input semantic identity [501.1] named last_name to title case; ex: Smith.

In writing this transformation logic, the developer only needs to know the semantic name last_name, and does not require any knowledge about the associated physical identity or the attributes of the VSAM source where the data is physically located. For example, suppose that in a different application in a different project, the physical identity for last name data pulled from a mainframe was called NAME_LAST. As part of that effort, the semantic model were updated and a new additional semantic binding that associated NAME_LAST to the last_name semantic identity were created. The same transformation logic responsible for converting last_name to title case could be used because the transformation uses the semantic identity last_name that is common to both physical identities, LST_NM and NAME_LAST.

As a more complete example, suppose the VSAM file read by the example application has the following physical description:

TABLE 1

VSAM Metadata

| Physical Identity | Physical Datatype |
|---|---|
| ACC-NO | PICX(20) |
| TRANS-TYPE | PICX(1) |
| TRANS-AMT | 9(12)V9(2) |
| LAST-NAME | PICX(20) |
| FIRST-NAME | PICX(20) |
| ... | ... |

Suppose further that the RDBMS table written by the example application has the following physical description:

TABLE 2

RDBMS Metadata

| Physical Identity | Physical Datatype |
|---|---|
| accId | VARCHAR(32) |
| accBal | NUMERIC(10, 2) |
| lastName | VARCHAR(32) |
| firstName | VARCHAR(32) |
| ... | ... |

Outside of the context of the application project, a user would use the semantic maintenance tool to import the physical identities specified in Tables 1 and 2, in order to rationalize these physical identities to semantic identities, as described above (if the repository already contains semantic records corresponding to these two data tables, then it would not be necessary to import these physical identities again; for present purposes we assume that they are being imported for the first time). At this point, for each of these physical identities, the semantic maintenance tool will suggest corresponding semantic identities. The user can affirm or override these suggestions.

When this process is completed, the result is a mapping of (physical identity, semantic identity) pairs. Suppose, for the purposes of the present example, that this mapping is specified as follows:

TABLE 3

Mapping from Physical to Semantic Identities

| Physical Identity | Semantic Identity |
|---|---|
| ACC-NO | account_number |
| accId | account_number |
| accBal | account_balance |
| TRANS-TYPE | transaction_type |
| TRANS-AMT | transaction_amount |
| LAST-NAME | last_name |
| lastName | last_name |
| FIRST-NAME | first_name |
| firstName | first_name |
| ... | ... |

At this point, the user may associate the title-case rule (as described above) with the semantic identity last_name. This rule, along with any other rules created by the user and associated with semantic identities, are stored in the repository.

The user may now create semantic records corresponding to both the VSAM file and the RDBMS data sources, within the context of a specific project. These semantic records combine the physical metadata contained in Tables 1 and 2 with the semantic bindings in Table 3. For example, the semantic record SR1, corresponding to the VSAM file, would contain the following:

TABLE 4

Semantic Record for VSAM file (SR1)

| Phys. Ident. | Phys. Datatype | Semantic Ident. | Semantic Datatype |
|---|---|---|---|
| ACC-NO | PICX(20) | account_number | string |
| TRANS-TYPE | PICX(1) | transaction_type | string |
| TRANS-AMT | 9(12)V9(2) | transaction_amount | number |
| LAST-NAME | PICX(20) | last_name | string |
| FIRST-NAME | PICX(20) | first_name | string |
| ... | ... | ... | ... |

And the semantic record SR2, corresponding to the RDBMS table, would contain the following:

TABLE 5

Semantic Record for RDBMS table (SR2)

| Phys. Ident. | Phys. Datatype | Semantic Ident. | Semantic Datatype |
|---|---|---|---|
| accId | VARCHAR(32) | account_number | string |
| accBal | NUMERIC(10, 2) | account_balance | number |
| lastName | VARCHAR(32) | last_name | string |
| firstName | VARCHAR(32) | first_name | string |
| ... | ... | ... | ... |

These semantic records are saved in the repository as part of the project corresponding to the sample application. In the same project, a user would use the development tool to create a visual drawing for the application that references these semantic records. To configure the Read-Data function, the user would specify metadata that identifies the location of the VSAM file from which the data must be read, and associate the previously-defined semantic record SR1 with the function as the function's output semantic record.

To configure the Transform-Data function, the developer would first connect the output of the Read-Data function to the input of the Transform-Data function, preferably via the graphical development tool, which represents functions and the connections between them using a graphical representation. Next, the developer would configure the output of the Transform-Data function to include the semantic identities listed in the semantic record SR2. When specifying semantic entities in the output of Transform-Data, the user will be presented with a menu of rules stored in the repository that operate on those identities (allowing the user to select only valid, predefined rules). In this case, suppose that when the user specifies last_name, the user selects the title-case rule (as defined above) from the rules menu.

Finally, the developer would connect the output of Transform-Data to the input of the Write-Data function, and specify the location of the RDBMS table to which the data must be written. As detailed above, the task of connecting two functions can be performed visually, using the graphical development tool. Throughout the process of configuring the application rules, the development tool never reveals the physical identities or datatypes of the source and target data to the user; this information is encapsulated in the semantic records SR1 and SR2, which are opaque to the application developer.

V. Output-Oriented Rules

Figure 7:
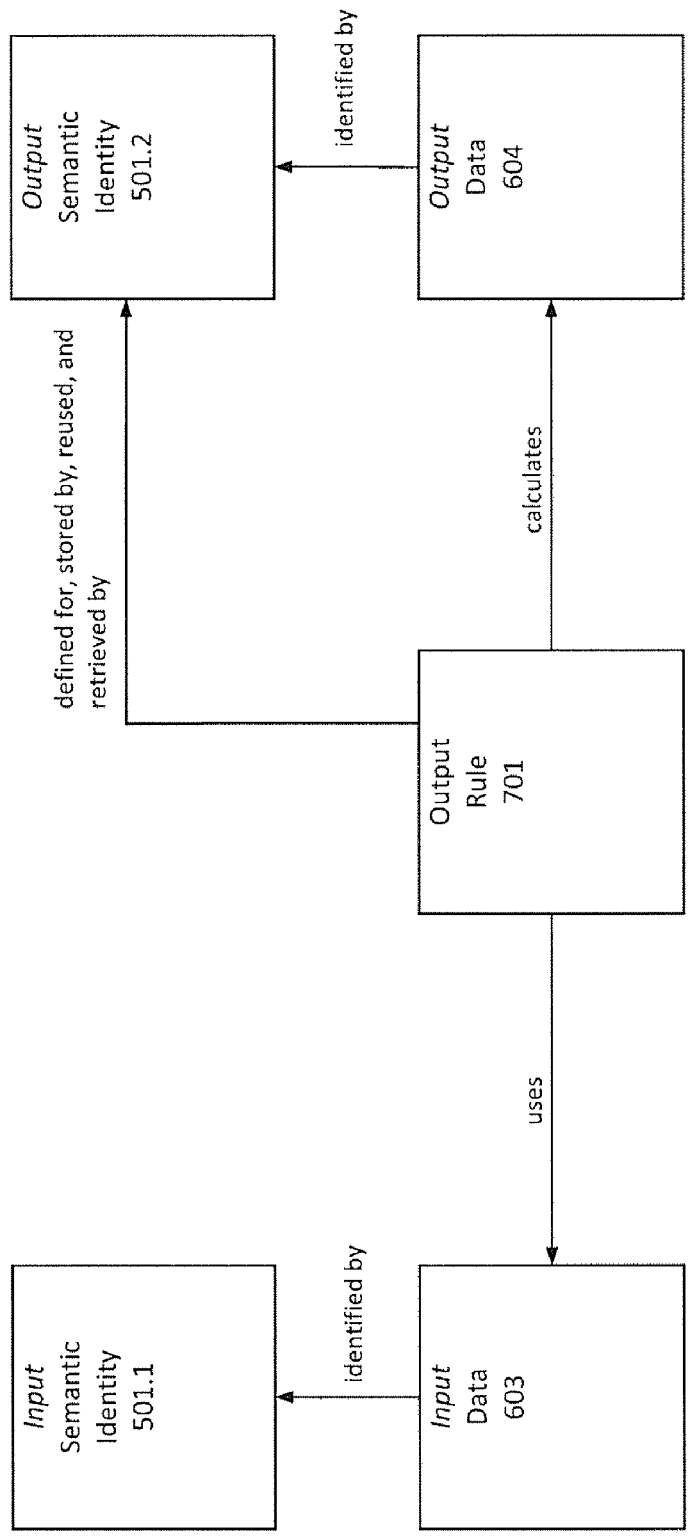
FIG. 7 is a relationship diagram that depicts an output-oriented rule definition, according to certain embodiments of the invention.

FIG. 7 is a relationship diagram (as described above) that depicts an output-oriented rule definition, according to a preferred embodiment. The rule [701] contains the logic and instructions to perform a calculation. Output data [604] is the actual data value that the rule will calculate and produce when it runs. An output semantic identity [501.2] is a semantic identity [501] from the semantic model (FIG. 5) that identifies the output data.

Depending on the type of rule, the rule may have input which is characterized as follows: input data [603], which comprises one or more actual input data values that the function will consume when it runs; an input semantic identity [501.1] is a semantic identity [501] from the semantic model (FIG. 5) that identifies an individual piece of data that will be input to the rule (an input parameter).

The rule [701] is defined to calculate a value for an output data field [604] with a given semantic identity [501.1]. All input data [603] required by the rule is identified using semantic identities [501].

There may be an arbitrary number of rules associated with a given semantic identity. Using the semantic maintenance tool [204] (FIG. 2), these rules can be developed independently from the application or function, tested (described in more detail below), stored and indexed by semantic identity in the repository [201] (FIG. 2), and then used in the transformation logic of a function.

Traditional data integration processes and systems lack the ability to semantically reconcile fields in different systems that are being integrated. In such processes hundreds, if not thousands, of business rules are documented for the purpose of mapping fields in source systems to the appropriate fields in target systems. In the present data integration system, because application functions can automatically correlate input and output data semantically, the system does not require a process to capture or implement data mapping rules as in traditional systems. These differences are explained in more detail in the examples below.

However, rules that perform some operation other than a direct move between input and output are still needed. The semantic data integration system optimizes the definition and employment of rules by semantically orienting them explicitly to output calculation as described.

Recalling the example presented in discussion of FIG. 6, the transformation logic associated with converting a last name to title case could be captured as a reusable output-oriented rule for the last_name semantic identity. This rule could be used in the sample application, as well as other applications in the same or different projects.

Figure 8:
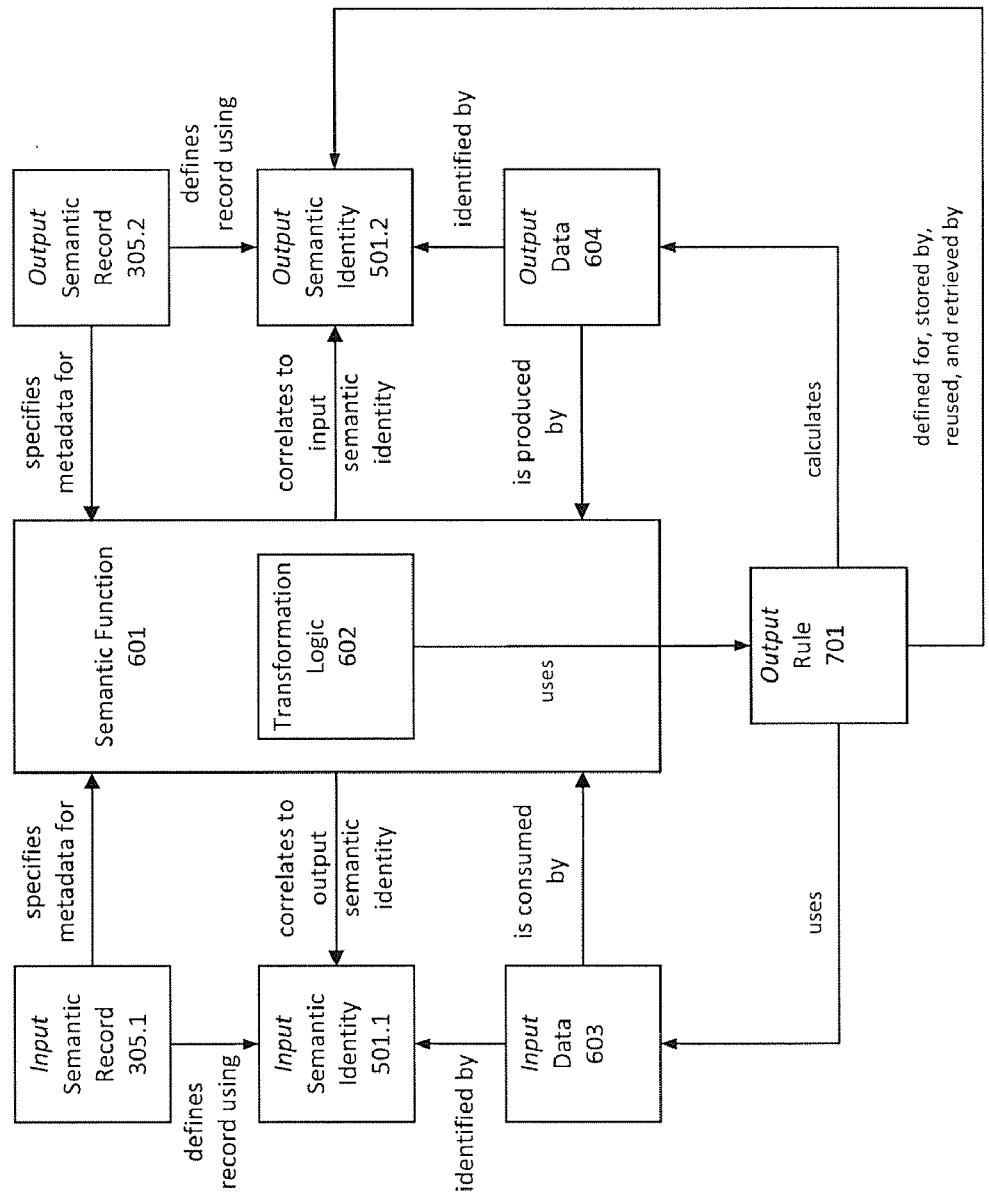
FIG. 8 is a relationship diagram that depicts the use of output-oriented rules in a function, according to certain embodiments of the invention.

FIG. 8 is a relationship diagram (as described above) that extends FIG. 7 and adds the concept in FIG. 7 to depict the preferred embodiment of output-oriented rules employment in a function [601].

Transformation logic is configured for the function to perform various transformations or manipulations on the input data [603] in order to produce the correct output data [604]. Rules refer to input data and output data using semantic identities [501.1] and [501.2] respectively.

As described above, an example of a rule used in a function may be something trivial such as changing the case of last name. It may also be used for something more complex such as calculating a weighted account average balance. Preferably, rules are specified using a standard programming language that has been extended to include primitives that operate on typical database fields.

Using our sample application [101] as an example, when the Transform-Data function is being configured by a developer, the calculations for its individual output fields are defined. The predefined output-oriented rule for title casing last_name may be referenced and used to define the calculation for that field in the function. An example of an alternative embodiment of this process allows for a new output-oriented rule to be defined at the same time that the transformation logic for Transform-Data is being configured. In this case the pre-existing title casing rule might not already exist and the developer might add it and save it to the repository for general use.

As further examples of output-oriented rules, consider the following:

TABLE 6

Example Output-Oriented Rules

| Target | Rule |
| --- | --- |
| master_account_type_code | master_account_type_code |
| account_type_code | account_type_code |
| account_start_date | datetime.moment(account_open_date, "C") |
| account_expiration_date | account_expiration_date |
| account_ever_activated_code | if is.empty(account_date_first_active) then "N" else "Y" |
| next_account_number | account_number + 1 |

These rules are written in an untyped programming language, and type-conversions are performed by the system as necessary. Because the system performs type-conversions automatically, the application developer does not need to know the semantic datatypes of the semantic identities used in a rule. For example, the semantic identities account_number and next_account_number might have semantic datatypes of string, and would therefore be represented internally as sequences of characters. However, a developer might treat account_number as an integer, as illustrated in Table 6, where next_account_number is defined as account_number+1. In this case, the system will recognize that "+" is an operator that applies to integers, convert account_number to an integer and perform the requested calculation. Finally, it will convert the result to a string, since the semantic datatype of next_account_number is string.

It is not necessary to include rules in the rules repository that merely pass the value of a semantic identity from input to output without applying a transformation (e.g., the rule for master_account_type_code in Table 6, above). This "pass-through" operation is the default behavior for semantic identities and will be applied if no rule is specified. Thus, although there is no rule for account_number specified above, any rule that receives account_number as part of its input semantic record will pass the received value through to its output semantic record.

By contrast, traditional integration systems require the source and target locations, table names, and datatypes used in a rule to be stored with the rule logic. Using the traditional approach, the rules described in Table 6 might be represented as follows:

TABLE 7

Traditional Representation of Transformation Rules

| Target Table | Target Column | Target Type | Rule | Source Table | Source Column | Source Type |
|---|---|---|---|---|---|---|
| ACC_INFO | MST_ACC_TYPE | INTEGER | MST_ACC_TYPE | ACCT_INF | MST_ACC_TYPE | INTEGER |
| ACC_INFO | ACC_TYPE_CD | CHAR(1) | ACC_CD | ACCT_INF | ACC_CD | CHAR(1) |
| ACC_INFO | ACC_ST_DATE | DATE | time(ACC_OP, "C") | ACCT_INF | ACC_OP | DATE |
| ACC_INFO | ACC_EXP_DATE | DATE | ACC_EXP_DT | ACCT_INF | ACC_EXP_DT | DATE |
| ACC_INFO | ACCT_EVER_ACT | CHAR(1) | if is.empty(ACC_ACT) then "N" else "Y" | ACCT_INF | ACC_ACT | CHAR(1) |
| ACC_INFO | NXT_ACC_NO | CHAR(20) | tochar(toint(ACC_NO) + 1) | ACCT_INF | ACC_NO | CHAR(20) |
| ACC_INFO | ACC_NO | CHAR(20) | ACCT_NUM | ACCT_INF | ACCT_NUM | CHAR(20) |
| ACC_INFO | ACC_NO | CHAR(20) | tochar(ACCT_NO) | AC_DATA | ACCT_NO | INTEGER |

Specifying rules in the traditional way (as illustrated in Table 7) requires that the developer know not only the physical locations and names of the business objects being referenced, but their internal data format as well. In such a system, the developer would be forced to perform type conversions explicitly: for example, to add "1" to ACC_NO, the rule "tochar(toint(ACC_NO)+1)" might be used (as opposed to the untyped rule definition account_number+1, as used above).

Also, it is necessary to specify pass-through rules using the traditional approach: for example, two rules are defined for ACC_NO in Table 7, both of which read source data from different physical sources whose data are stored using different formats. As explained above, output-oriented rules do not require pass-through rules to be specified, because the physical data sources and datatypes are included as part of a semantic identity.

VI. Synthetic Debugging

Figure 9:
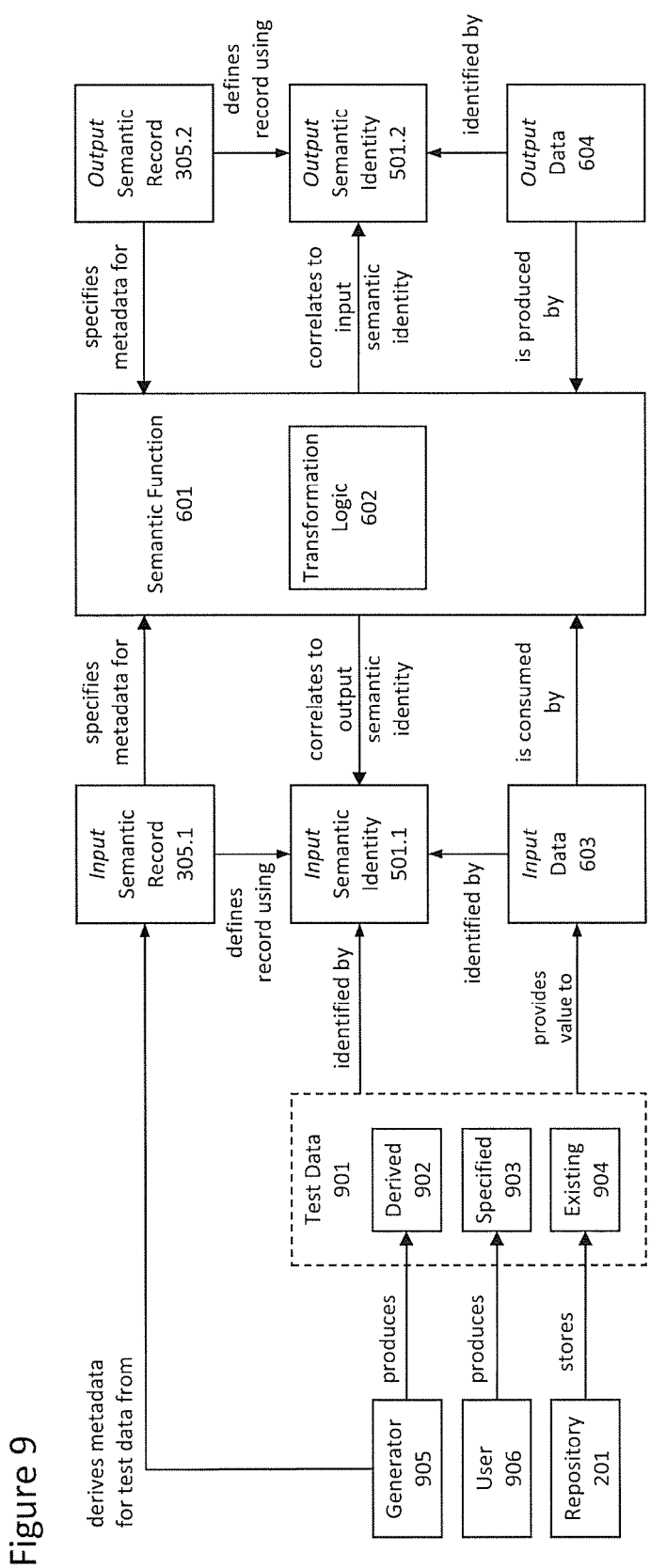
FIG. 9 is a relationship diagram that depicts the preferred embodiment of function-level synthetic debugging and testing for semantic data integration.

FIG. 9 is a relationship diagram (as described above) that extends FIG. 6 to depict the preferred embodiment of function-level synthetic debugging and testing for semantic data integration. A function [601] and its transformation logic [602] (as described above) may be tested using test data [901]. Test data for each input semantic identity [501.1] may come from a variety of sources including: derived test data [902], which is be automatically derived from the input semantic record by a generator function [905], specified test data [903], which is manually specified by the user [906], and existing test data [904], which is retrieved from the repository [201].

The system preserves data security by not exposing actual business data values within the development tool or while a data integration application is being executed by the engine. In order to debug and test applications, synthetic debugging and testing is employed at the function level. The ability to provide synthetic test data also allows for offline development in situations when the actual data sources might not be available.

After initiating a debugging exercise from within the development tool, the user will assign test data [901] for each input semantic identity [501.1]. Test data values can come from multiple sources. A test data generator function [905] can use information derived from the input semantic record [305.1] to synthetically generate test values [902], the user [906] may manually specify the test data values [903], or existing test data values [904] that are cataloged in the repository [201] by semantic identity may be used. The user may choose to store test data values for each semantic identity back to the repository for future debugging and testing. Once test data has been assigned, the user can test the function with these test values. In this test one iteration of the function will run using the input test data to produce the function's output data [604] which can then be displayed by the development tool and validated by the user.

Using the sample application [101] as an example, a developer may want to synthetically debug the Transform-Data function [103], in particular the logic described above that changes the case of last_name. The developer may first try to re-use existing test data [904] from the repository. If no test data for last_name is found, the developer may try to generate test data [902]. Using the metadata from the input semantic record, the test data generator [905] may generate test data [902] that looks like this: 'AaBbCcDdEeFfGgHhIiJj'. Upon testing this data with the function, the output correctly produces 'Aabbccddeeffgghhiijj'. In order to further validate the function, the developer specifies his own test data [903]: 'sT. jOHn'. Upon testing this data with the function, the output correctly produces 'St. John'.

The developer saves this new test data to the repository so that it may be re-used the next time a developer needs test data for last_name. This is accomplished by, e.g., associating the new test data value with the associated semantic identity in a relational database table.

The ability to enter custom test data values allows the developer to ensure that a function responds appropriately to certain problematic input values that might not be generated by the random test data generator (e.g. integers that include random letters, negative account numbers, etc.). These custom values are associated with a semantic identity (e.g., last_name), so once entered, they can automatically be reused as test data for any function, in any project, that uses the same semantic identity.

VII. Enterprise Maintenance

Figure 10:
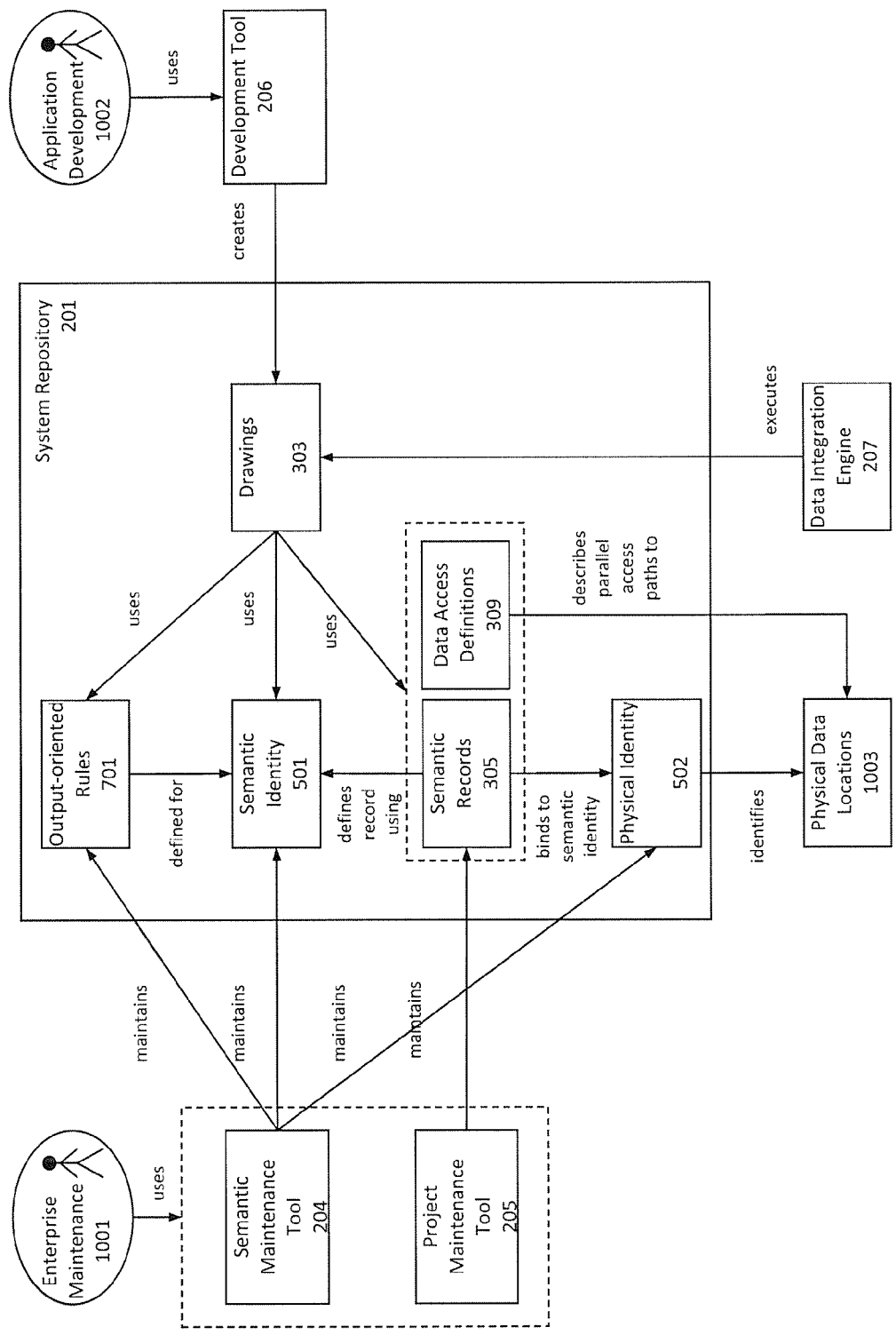
FIG. 10 is a diagram that illustrates the separation of development roles in a semantic data integration project, according to certain embodiments of the invention.

FIG. 10 combines a relationship diagram (as described above) and UML use-case diagram to depict the high-level separation of semantic data integration user activities, according to a preferred embodiment. Activities performed by system users can be classified either as enterprise maintenance or as application development.

Enterprise maintenance [1001] is performed with the semantic maintenance tool [204] and the project maintenance tool [205], and has two basic subcategories. Semantic maintenance deals with the maintenance of the semantic model [202] including semantic identities [501] and physical identities [502] (FIG. 5), and output-oriented semantic rules [701] (FIG. 7). Project maintenance is concerned with the maintenance of the project state and architecture-level objects such as semantic records [305] (FIG. 5) and data access definition [309] (FIG. 3) which may be defined at the project level or across the enterprise when reusability is possible.

Application development [1002] is performed with the development tool [206] (FIG. 2) and is concerned with the development of data integration drawings [303] within or across projects. Application development involves many of the objects that fall within the purview of enterprise maintenance, such as semantic identities and output-oriented rules. However, physical identities are never referenced in the context of application development.

As a result of this enforced separation between application development and physical identities, the application developer does not require knowledge of physical identities [502] or physical data locations [1003]. Applications may be developed independent of the physical data sources that they will integrate, providing a level of insulation from physical data sources whose location, connectivity, structure, and metadata may be unstable.

Recall the example first provided in the discussion for FIG. 3. In that example the project manager and data architect were performing enterprise maintenance [1001] activities as described above, including project maintenance. Additionally, a data steward would perform semantic maintenance, such that many of the semantic bindings [503] needed for the semantic records [305] created during project maintenance would already exist. When creating the semantic records that describe the VSAM file [105], the enterprise architect may discover that a semantic binding does not yet exist between the last_name semantic identity and the LST_NM field in the VSAM file. This binding could have been defined by a data steward during regular semantic maintenance activities. But if the binding does not exist, the data architect can also create that binding. Once all of the necessary semantic bindings exist, the data architect can complete the task of creating the semantic record for the VSAM file. Once the semantic record is complete and exists as a project artifact, the developer can be told to use that record.

The developer would then use that semantic record when creating the drawing [303] that describes the actual application [101]. At no point does the developer need to know anything about the physical nature of the VSAM file structure including the physical identities of its data. The developer can work strictly with semantic identities to define the data integration application.

VIII. Data Integration Engine

Figure 11:
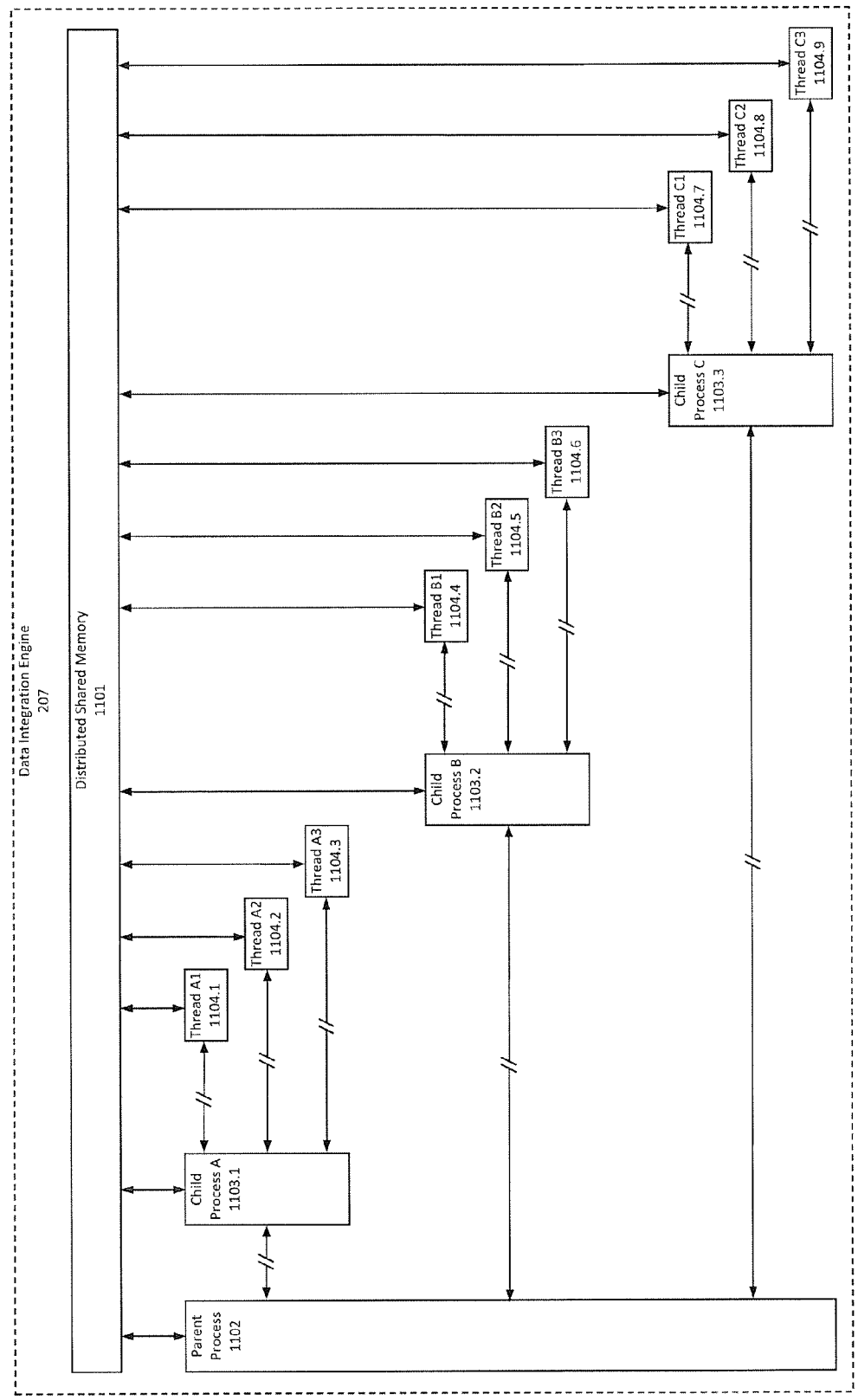
FIG. 11 is a control flow relationship diagram that illustrates the control flow within the data integration engine when a sample data integration application is executed on a single host, according to certain embodiments of the invention.

FIG. 11 is a control flow relationship diagram that illustrates the control flow within the data integration engine when the example application [101] is executed on a single host, according to a preferred embodiment. A control flow relationship diagram is a hybrid UML class/activity diagram that conveys the directionality of communication or contact between objects or components. Solid arrows indicate synchronous communication or contact and broken arrows indicate asynchronous communication or contact.

The data integration engine [207] has a single parent process [1102] which is a top-level operating system process whose task is to execute a data integration application defined by artifacts [302] within a specific project [203.1] (FIG. 3). The data integration engine uses these artifacts (e.g., the application drawing) to set up, initialize, and perform the data integration.

Distributed shared memory [1101] is a structured area of operating system memory that is used by the parent process [1102] and the child processes [1103.1, 1103.2, 1103.3] running on that host. Each of these child processes is responsible for performing a single function within the application. In the sample application [101], child process A [1103.1] executes to the Read-Data function [102], child process B [1103.2] executes to the Transform-Data function [103], and child process C [1103.3] executes to the Write-Data function [104]. Worker threads [1104.1-1104.9] subdivide the processing for each child process.

When the parent process [1102] starts, it analyzes the application drawing [303] (FIG. 2) and related metadata in other project artifacts to initialize and run the application. The parent process creates and initializes a shared properties file (not shown) with control flow characteristics for the child processes and threads. The parent process also creates and initializes the distributed shared memory [1101], a section of which is specifically created for and assigned to each child process and thread. Each child process writes information about its execution status to its assigned portion of the distributed shared memory, and this is used by the parent process [1102] to provide updates about the execution status of the data integration engine.

After initialization, the parent process will create each child process [1103.1, 1103.2, 1103.3], synchronously or asynchronously depending on the nature of the function. One child process is created for each function in the drawing (e.g. Read-Data, Write-Data, and Transform-Data, in the example application [101]). When possible, the engine runs each function in parallel so that one function does not need to complete in order for the next to begin.

Upon creation, each child process will read characteristics relevant to its execution from the shared properties file. These characteristics include information about how many threads should be running simultaneously to maximize parallelism. For example, if the shared properties file indicates that there are three different physical data sources for the data read by child process A [1103.1], then child process A will spawn three worker threads [1104.1, 1104.2, 1104.3], each of which loads its data from a different source.

Continuing this example, because child process A is reading data from three sources using three different threads, it has three outputs. So, child process B, which transforms the data read by child process A, has three sources of input. Child process B accordingly spawns three worker threads [1104.4, 1104.5, 1105.6], each thread reading the data output by one of the worker threads spawned by child process A. Finally, child process C, which writes the output of child process B to the specified target, spawns three threads, each of which corresponds to a thread spawned by child process B. This thread system allows the data integration engine to take advantage of the parallelism made possible by multiple data sources.

When a function involves reading from or writing to a data source, the data integration engine examines the application drawing to determine the type of the data source involved. Based on the type of the data source, the appropriate interface methods are selected, and the data is read or written accordingly.

Control flow is asynchronous and non-locking between parent process, child processes, and threads. This is achieved by combining an update-then-signal asynchronous protocol for all communication (except for communication between threads, described above) and signaler-exclusive distributed shared memory segmentation. Under the update-then-signal protocol, when a parent or child process needs to communicate with its child process or thread, respectively, it may update the distributed shared memory of the child and then asynchronously signal the child. When the child handles the signal, it will read its updated distributed shared memory (if necessary) and react. Communication in the other direction is the same. When a thread or child process needs to communicate with its parent (child process or parent process, respectively), it may first update its distributed shared memory and then asynchronously signal the parent. When the parent handles the signal, it will read the updated distributed shared memory (if necessary) and react. The distributed shared memory areas used for communication are exclusively written by the signaler, ensuring that two processes never attempt to access the same memory simultaneously.

Figure 12:
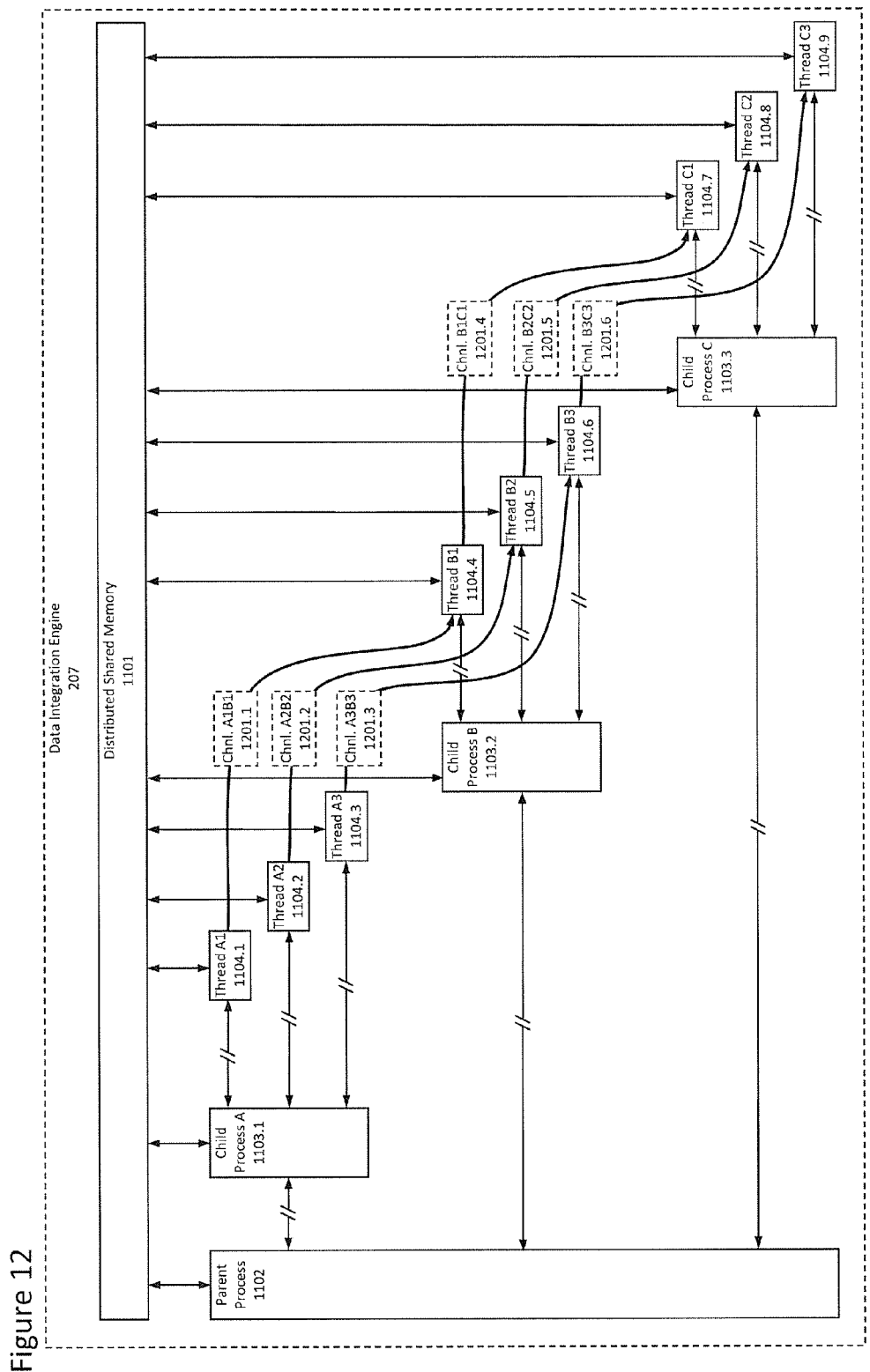
FIG. 12 is a data flow relationship diagram that illustrates the flow of data within the data integration engine when a sample data integration application is executed on a single host, according to certain embodiments of the invention.

FIG. 12 is a data flow relationship diagram that extends FIG. 11 to depict the flow of data within the data integration engine [207] when the example application is executed on a single host. A data flow relationship diagram is an extension of the control flow relationship diagram (as described above) whose purpose is to convey the directionality and flow of data between objects or components. Relevant, previously described, control flow may be shown as muted or grayed, while the objects pertinent to the data flow within that control flow will be prominent or black. The data flow is captured with an arrow indicating the source of the data (no arrow pointer) and the target of the data (arrow pointer) that is optionally labeled with the resource responsible for the data flow.

The only additional annotations in FIG. 12 are channels [1201.1-1201.6] which are resources that are used for passing data from a worker thread for one function to a worker thread for another. Recall from above that the role of child process A [1103.1] is to read data (see the Read-Data function [102] in FIG. 1), the role of child process B [1103.2] is to produce new data by applying transformation logic to that data (see the Transform-Data function [103] in FIG. 1), and the role of child process C [1103.3] is to write the data produced by child process B (see the Write-Data function [104] in FIG. 1). In this model, data flows through a dedicated channel from a worker thread spawned by one child process to a worker thread spawned by another child process. Channels are implemented directly or indirectly through any means of interprocess communication, e.g. named pipes, sockets, riiop, rpc, soap, oob, and mpi.

As described above, each child process subdivides its work using parallel worker threads. In addition, because the characteristics of each function in this example allow for simultaneous processing, child process B [1103.2] does not wait for child process A [1103.1] to read all of the data before it begins; it can start transforming data received from child process A as soon as child process A outputs any data. Similarly, child process C [1103.3] does not wait for child process B to transform all of the data before it begins; it can start writing data received from child process B as soon as child process B outputs any data.

In the application drawing, each semantic record is associated with a list of Universal Resource Indicators (URIs) that point to the relevant data. These URIs might point to redundant copies of identical data or to data sources containing different data, but all of the indicated data sources must conform to the semantic record format that is specified in the file. Generally, each URI in the list will be unique, allowing the engine to leverage parallelism by reading data simultaneously from several different locations. However, this is not a requirement, and if desired, two or more identical URIs can be listed.

Channel data flow in the sample application is structured as follows: each worker thread on child process A will read data in parallel from a data source specified by one of the listed URIs. As each thread [1104.1, 1104.2, 1104.3] spawned by child process A reads data, it makes that data available as output from child process A to be used as input for child process B [1103.2] by moving the data through a dedicated channel. In this example channel A1B1 [1201.1] is a resource that is defined to pass data from thread A1 [1104.1] on child process A to thread B1 [1104.4] on child process B, channel A2B2 [1201.2] passes data from thread A2 [1104.2] to thread B2 [1104.5], and channel A3B3 [1201.3] passes data from thread A3 [1104.3] to thread 6 [1104.6].

When each worker thread is spawned, it receives information that can be used to identify an input channel and an output channel, using a predetermined channel identification scheme. The thread connects to both of these channels, reads data from the input channel, and writes output data to the output channel. Thus, each thread connects on startup to the appropriate data channels.

Figure 13:
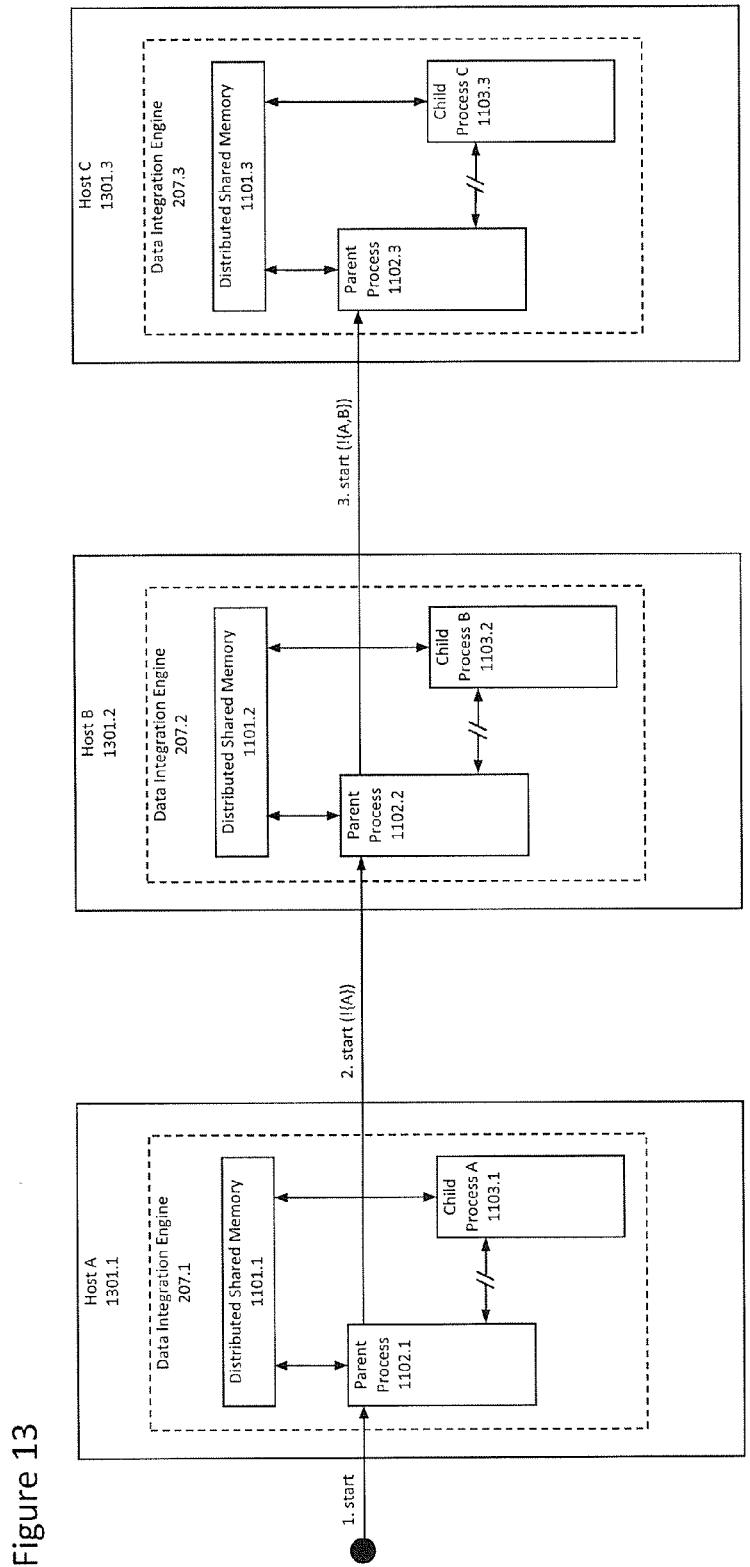
FIG. 13 is a modified UML collaboration diagram that illustrates the startup sequence that results when a sample data integration application is executed in a distributed environment, according to certain embodiments of the invention.

FIG. 13 is a modified UML collaboration diagram that illustrates the startup sequence that results when the sample application is executed in a distributed environment comprising three hosts [1301.1, 1301.2, 1301.3], according to a preferred embodiment. UML collaboration diagrams are used to convey the order of messages passed between object or components. In the collaboration diagrams used here, existing control flow relationships may also be depicted in gray in order to preserve useful context.

The primary difference between this scenario and that depicted in FIG. 11 is that processing will be distributed across 3 hosts [1301.1, 1301.2, 1301.3] in a networked environment. In particular, the first function is specified to run on host A [1301.1], the second function is specified to run on host B [1301.2], and the third function is specified to run on host C [1301.3].

The application is started by executing the data integration engine [207.1] on host A, the "master" host. During the initial setup of the integration engine, the master host reads the application drawing to determine which application functions will be executed on the master host. Each function is associated with a list of URIs, each of which represents a host on which the function can be executed. For each function, the application developer selects one of the listed hosts from the list, the selection is recorded in the application drawing, and the corresponding host is used by the data processing engine to execute the function. If no host is specified, the function will execute by default on the same host as the previous function, if possible.

Binary data is passed between hosts using any standardized protocol and byte-order. Preferably, network byte-order is used to transfer binary data between hosts and to temporarily store data on execution hosts. When an operation must be performed that operates on data in machine-native format, the data is automatically converted to machine-native byte-order for the operation, and converted back to the standardized byte-order (e.g., network byte-order) afterwards.

In the particular case of the example application [101], the host A parent process [1102.1] determines that only the Read-Data function will run as a child process on host A. The host A parent process creates a full structure for distributed shared memory [1101.1] but only the sections relevant to child processes that need to run on host A will be initialized, in this case the single child process for the first function. A child process [1103.1] for the Read-Data function is then started on host A in the manner described above. Note that the host A parent process [1102.1], distributed shared memory [1101.1], and child process A [1103.1] are analogous to the parent process [1102], distributed shared memory [1101], and child process A [1103.1] described above in FIG. 11 and FIG. 12.

The host A parent process then starts a new engine parent process [1102.2] on host B, passing input indicating that functions already reserved for host A should be ignored. During initial analysis of the input application, the host B parent process ignores the Read-Data function since it is marked for host A and determines that only the Transform-Data function should run as a child process on host B. As explained above, this choice was optionally made by the developer during the development process and is recorded in the application drawing artifact.

The host B parent process creates a full structure for distributed shared memory [1101.2] but only the sections relevant to child processes that need to run on host B will be initialized (in this case, the child process for the Transform-Data function). A child process for the Transform-Data function is then started on host B in the manner described above. Note that the host B parent process [1102.2], distributed shared memory [1101.2], and child process B [1103.2] are analogous to the parent process [1102], distributed shared memory [1101], and child process B [1103.2] described above in FIG. 11 and FIG. 12.

The host B parent process then starts a new engine parent process [1102.3] on host C, passing input indicating that functions already reserved for hosts A and B should be ignored. During initial analysis of the input application, the host C parent process ignores the Read-Data and Transform-Data functions because they have been reserved for the other hosts, and determines that only the Write-Data function should run as a child process on host C. As explained above, this choice was optionally made by the developer during the development process and is recorded in the application drawing artifact.

The host C parent process creates a full structure for distributed shared memory [1101.3] but only the sections relevant to child processes that need to run on host C will be initialized (in this case, the child process for the Write-Data function). A child process for the Write-Data function is then started on host C in the manner described above. Note that the host C parent process [1102.3], distributed shared memory [1101.3], and child process C [1103.3] are analogous to the parent process [1102], distributed shared memory [1101], and child process C [1103.2] described above in FIG. 11 and FIG. 12.

Because there are no more functions to be allocated at this point, the distributed startup sequence is complete.

Figure 14:
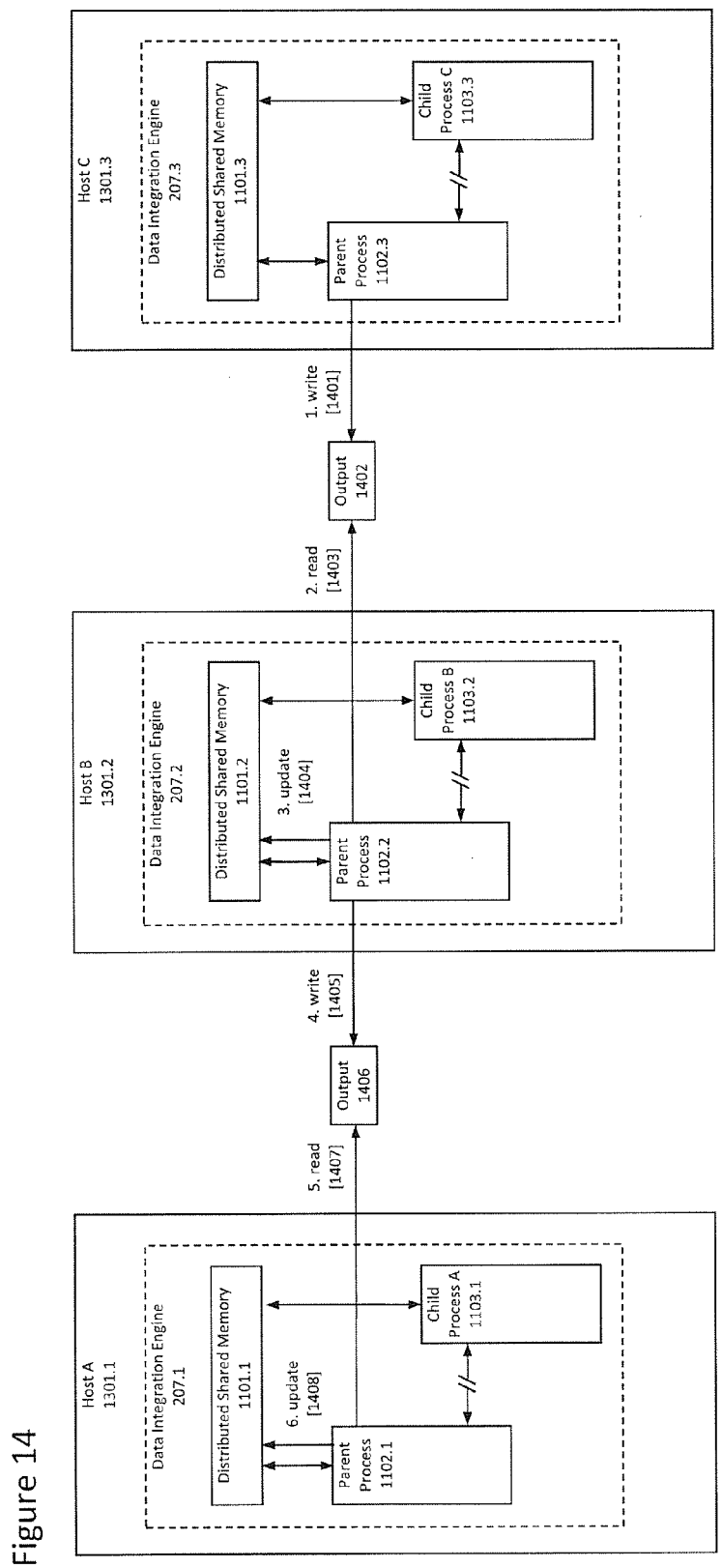
FIG. 14 is a modified UML collaboration diagram that illustrates the process of distributed shared memory replication when a sample data integration application is executed in a distributed environment, according to certain embodiments of the invention.

FIG. 14 is a modified UML collaboration diagram (as described above) that extends FIG. 13 to illustrate the process of distributed shared memory replication when the sample application is executed in a distributed environment comprising three hosts.

In a distributed processing scenario, additional control flow is needed to communicate the status of each host. The parent process [1102.1] on the master host A [1301.1] is responsible for directing the entire application across hosts. As a result of this, its distributed shared memory [1101.1] must reflect the state of all child processes on all child hosts. To do this distributed shared memory is partially replicated from host to host.

Each child process is responsible for updating its portion of the distributed shared memory structure at regular intervals. In the example application, the replication process begins on host C [1301.3] when its update interval arrives. At this point, the parent process [1102.3] writes [1401] its output [1402]. When the update interval for host B [1301.2] is reached, the host B parent process [1102.2] will read [1403] the output from the host C parent process, and update [1404] its distributed shared memory [1101.2] with the control data it read as output from host C. A cumulative update of control data including control data from host B and host C is then written [1405] as output [1406] from the parent process. When the update interval for host A is reached, the host A parent process [1102.1] will read [1407] the output from the host B parent process (which it started), and update [1408] its own host A distributed shared memory [1101.1] with the control data it read as output from host B.

The parent process on the master host periodically reads the contents of the distributed shared memory to obtain information related to each of the child processes. This process occurs at regular intervals, and is timed according to a user-configurable parameter. The information read from the distributed shared memory is used to monitor the progress of the child processes and to provide status updates. Using a distributed shared memory structure to provide status updates allows the child processes to process data in an uninterrupted fashion, without pausing periodically to send status messages. Essentially, this creates a system by which data are transferred from child process to child process "in-band" while status messages and updates are transferred "out-of-band," separate from the flow of data.

Figure 15:
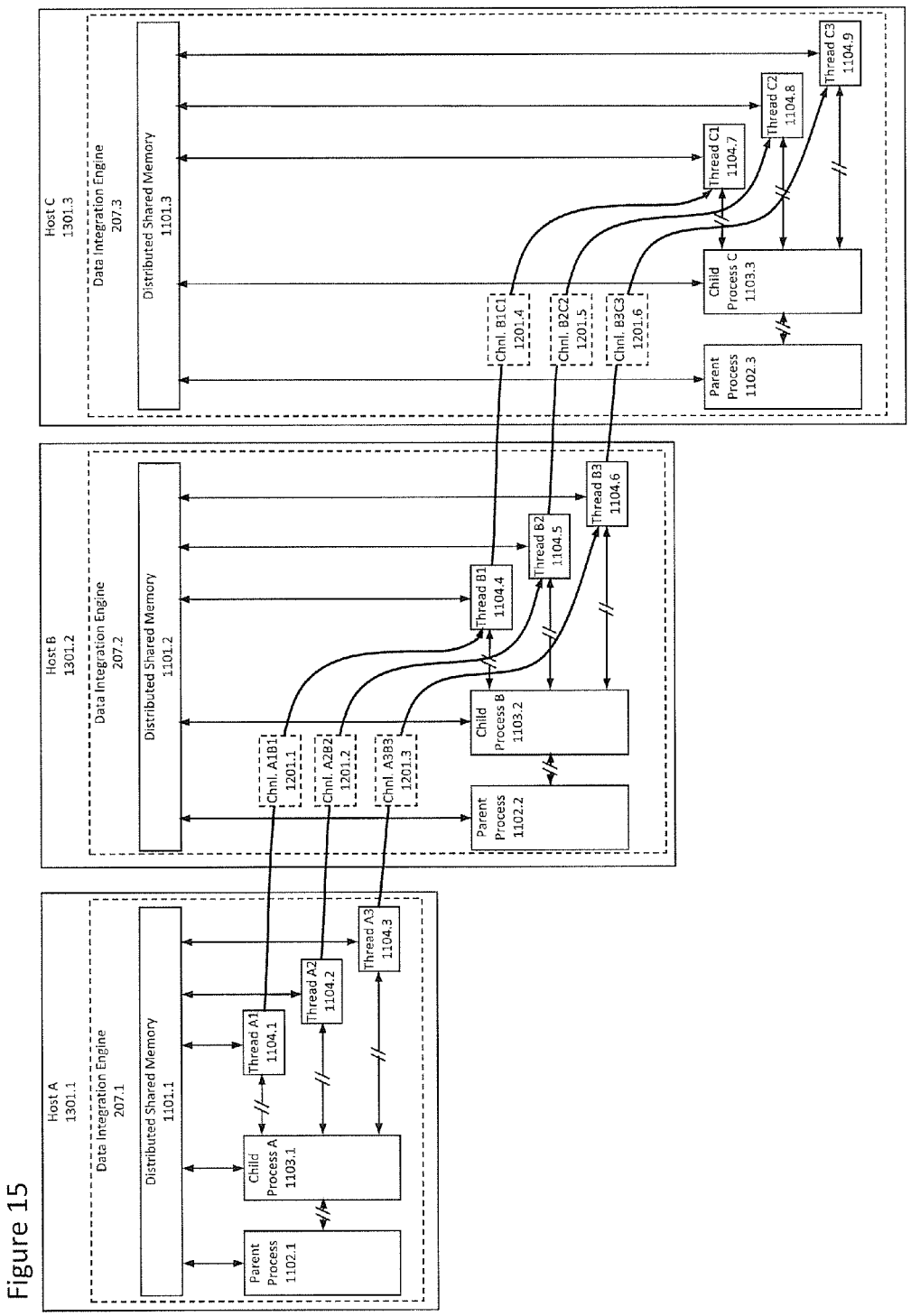
FIG. 15 is a data flow relationship diagram that illustrates the flow of data in the data integration engine when a sample data integration application is run in a distributed environment, according to certain embodiments of the invention.

FIG. 15 is a data flow relationship diagram (as described above) that merges FIG. 12 and FIG. 13 to illustrate the flow of data in the data integration engine when the sample application is run in a distributed environment comprising three hosts. The channel data flow method being employed is identical to the single-host/single-instance method described above (FIG. 12), except that the channels now operate to pass data between threads running on different hosts. The communication channels that pass data between threads across hosts can be implemented using any inter-host communication means, including sockets, riiop, rpc, soap, oob, and mpi.

It will be appreciated that the scope of the present invention is not limited to the above-described embodiments, but rather is defined by the appended claims; and that these claims will encompass modifications of and improvements to what has been described.

What is claimed is:

1. A method of executing a data integration application using executable units, wherein the executable units are able to operate independently of each other, the method performed by one or more processors comprising:
    a. receiving a specification for a data integration application, wherein the received specification specifies:
        a set of computer-readable data sources from which data are to be extracted;
        a set of computer-writable data targets into which data are to be stored;
        a set of programmatic rules comprising extraction rules, which operate to extract data from a data source and to produce the extracted data as output, transformation rules, which operate to receive data as input and to produce transformed data as output, and storage rules, which operate to receive data as input and to store the received data into a data target; and
        a set of directional data-flow segments that represent the data-flow among the programmatic rules, wherein each data-flow segment represents the unidirectional flow of data from a source rule to a destination rule;
    b. creating executable units, wherein each executable unit corresponds to one of the programmatic rules and is initialized with computer logic operable to implement the corresponding programmatic rule;
    c. creating data-flow channels, wherein each data-flow channel corresponds to one of the specified data-flow segments such that the data-flow channel is operable to convey data from the source rule of the data-flow segment to the destination rule of the data-flow segment;
    d. launching the executable units, such that the executable units operate independently of each other to process data and to convey said data through the data-flow channels according to the specified data-flow, and such that each of the executable units provides status information that is independent of the data-flow channels.

* * * * *